US012400392B2

(12) United States Patent
Maeda et al.

(10) Patent No.: US 12,400,392 B2
(45) Date of Patent: Aug. 26, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Mitsuru Maeda, Tokyo (JP); Koji Okabe, Tokyo (JP); Hidekazu Kamei, Kanagawa (JP); Hinako Funaki, Kanagawa (JP); Yuya Ota, Kanagawa (JP); Taku Ogasawara, Tokyo (JP); Kazufumi Onuma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 222 days.

(21) Appl. No.: 18/449,608

(22) Filed: Aug. 14, 2023

(65) Prior Publication Data
US 2023/0386127 A1 Nov. 30, 2023

Related U.S. Application Data

(63) Continuation of application No. PCT/JP2022/002977, filed on Jan. 27, 2022.

(30) Foreign Application Priority Data

Feb. 18, 2021 (JP) ................. 2021-024137

(51) Int. Cl.
G06T 15/20 (2011.01)
G06T 7/40 (2017.01)
G06T 17/20 (2006.01)
(52) U.S. Cl.
CPC ............. G06T 15/20 (2013.01); G06T 7/40 (2013.01); G06T 17/20 (2013.01); G06T 2207/10024 (2013.01); G06T 2207/10028 (2013.01)

(58) Field of Classification Search
None
See application file for complete search history.

(56) References Cited

U.S. PATENT DOCUMENTS

2021/0133944 A1 5/2021 Sakakima
2022/0084282 A1* 3/2022 Araki ................... H04N 19/597

FOREIGN PATENT DOCUMENTS

JP H09282249 A 10/1997
JP 2002149554 A 5/2002
(Continued)

OTHER PUBLICATIONS

Aljoscha Smolic, 3D video and free viewpoint video-From capture to display, 15 Sep. 2010, Pattern Recognition 44 (2011) pp. 1958-1968.*

(Continued)

Primary Examiner — Frank S Chen
(74) Attorney, Agent, or Firm — Canon U.S.A., Inc. IP Division

(57) ABSTRACT

An information processing apparatus includes a management unit configured to acquire a plurality of material data for use in generation of a virtual viewpoint image based on a plurality of images captured with a plurality of cameras by imaging an object, the plurality of material data including first material data and second material data different from the first material data, and a transmission/reception unit configured to output, to a device, material data that has been selected from among the plurality of acquired material data based on information for identifying a format of material data processable by the device.

27 Claims, 24 Drawing Sheets

(56) References Cited

FOREIGN PATENT DOCUMENTS

| | | |
|---|---|---|
| JP | 2004222124 A | 8/2004 |
| JP | 2016071645 A | 5/2016 |
| KR | 20200072321 A | 6/2020 |
| WO | 2018147329 A1 | 8/2018 |
| WO | 2020013077 A1 | 1/2020 |
| WO | 2020017134 A1 | 1/2020 |

OTHER PUBLICATIONS

Dongdong Zhang, et al., "Kinect-based 3D Video Conference System", Computer Science Department, Tongji University, Shanghai, China.

* cited by examiner

FIG.2A

Data Set:
- Sequence Header
- Foreground Header
  - 0th frame
  - 1st frame
  - ...
  - Nth frame
- Point Cloud model Header
  - 0th frame
  - 1st frame
  - ...
  - Nth frame
- Colored Point Cloud model Header
  - 0th frame
  - 1st frame
  - ...
  - Nth frame
- Mesh Header
  - 0th frame
  - 1st frame
  - ...
  - Nth frame
- Distance Image Header
  - 0th frame
  - 1st frame
  - ...
  - Nth frame

FIG.2B

| Sequence Header Start Code | FIXED VALUE |
|---|---|
| Sequence Description | |
| Number of Data set | M |
| 1st Data set Description | |
| 2nd Data set Description | |
| ... | |
| Mth Data set Description | |

FIG.2C

| Sequence_Name | |
|---|---|
| Location | |
| Start Time information | yyyy.mm.dd.hh.mm.ss.ff |
| Frame rate | |
| Image Size | |
| Number of Camera | C |
| 1st Camera ID | |
| 1st Camera Parameter | |
| 2nd Camera ID | |
| 2nd Camera Parameter | |
| ... | |
| Mth Camera ID | |
| Mth Camera Parameter | |

FIG.2D

| Data set ID | Data set class code |
|---|---|
| Kind of Data set | |
| Frame rate | |
| Full Image size | |
| Pointer of Data set | |

FIG.2E

| Data set class code | |
|---|---|
| 0x0000 | Reserved |
| 0x0001 | Foreground Image |
| 0x0002 | Point Cloud model |
| 0x0003 | Colored Point Cloud model |
| 0x0004 | Polygon model |
| 0x0005 | Distance Images |
| 0x0006 | Reserved |
| ... | |

FIG. 3A

| Foreground Header |
|---|
| 0th frame |
| 1st frame |
| ... |
| Nth frame |

FIG. 3B

| Time Information | yyyy.mm.dd.hh.mm.ss.ff |
|---|---|
| Data Size | |
| Number of Object | P |
| Number of Camera | C |
| Camera ID of 1st Camera | |
| ... | |
| Camera ID of Cth Camera | |
| 1st Foreground Image of 1st Camera | Image Data |
| ... | |
| 1st Foreground Image of Cth Camera | Image Data |
| 2nd Foreground Image of 1st Camera | Image Data |
| ... | |
| 2nd Foreground Image of Cth Camera | Image Data |
| ... | |
| Pth Foreground Image of 1st Camera | Image Data |
| ... | |
| Pth Foreground Image of Cth Camera | Image Data |

FIG. 3C

| Data Size | |
|---|---|
| Image Size | xsize,ysize |
| Bit Depth | |
| Image data | ... |

FIG.4A

| Point Cloud model Header |
|---|
| 0th frame |
| 1st frame |
| ... |
| Nth frame |

FIG.4B

| Time information | yyyy.mm.dd.hh.mm.ss.ff |
|---|---|
| Data Size | |
| Number of Object | P |
| Number of Points in 1st Object | |
| Point coordination in 1st Object | x,y,z |
| ... | |
| Point coordination in 1st Object | x,y,z |
| Number of Points in 2nd Object | |
| Point coordination in 2nd Object | x,y,z |
| ... | |
| Point coordination in 2nd Object | x,y,z |
| Number of Points in Pth Object | |
| Point coordination in Pth Object | x,y,z |
| ... | |
| Point coordination in Pth Object | x,y,z |

FIG.5A

| Colored Point Cloud Header |
| --- |
| 0th frame |
| 1st frame |
| ... |
| Nth frame |

FIG.5B

| Time information | yyyy.mm.dd.hh.mm.ss.ff |
| --- | --- |
| Data Size | |
| Number of Object | P |
| Number of Points in 1st Object | |
| Point coordination in 1st Object | x,y,z,R,G,B |
| ... | |
| Point coordination in 1st Object | x,y,z,R,G,B |
| Number of Points in 2nd Object | |
| Point coordination in 2nd Object | x,y,z,R,G,B |
| ... | |
| Point coordination in 2nd Object | x,y,z,R,G,B |
| Number of Points in Pth Object | |
| Point coordination in Pth Object | x,y,z,R,G,B |
| ... | |
| Point coordination in Pth Object | x,y,z,R,G,B |

FIG.6A

| Distance Image Header |
|---|
| 0th frame |
| 1st frame |
| ... |
| Nth frame |

FIG.6B

| Time Information | yyyy.mm.dd.hh.mm.ss.ff |
|---|---|
| Data Size | |
| Number of Camera | C |
| Camera ID of 1st Camera | |
| ... | |
| Camera ID of Cth Camera | |
| Distance Image of 1st Camera | Image Data |
| ... | |
| Distance Image of Cth Camera | Image Data |

FIG.6C

| Data Size | |
|---|---|
| Image Size | xsize,ysize |
| Bit Depth | |
| Image data | ... |

FIG.7A

| Mesh Header |
| --- |
| 0th frame |
| 1st frame |
| ... |
| Nth frame |

FIG.7B

| | |
| --- | --- |
| Time information | yyyy.mm.dd.hh.mm.ss.ff |
| Data Size | |
| Number of Object | P |
| Number of Polygon in 1st Object | |
| Polygon information in 1st Object | x0,y0,z0, x1,y1,z1, x2,y2,z2,R,G,B |
| ... | |
| Polygon information in 1st Object | x0,y0,z0, x1,y1,z1, x2,y2,z2,R,G,B |
| Number of Points in 2nd Object | |
| Polygon information in 2nd Object | x0,y0,z0, x1,y1,z1, x2,y2,z2,R,G,B |
| ... | |
| Polygon information in 2nd Object | x0,y0,z0, x1,y1,z1, x2,y2,z2,R,G,B |
| Number of Points in Pth Object | |
| Polygon information in Pth Object | x0,y0,z0, x1,y1,z1, x2,y2,z2,R,G,B |
| ... | |
| Polygon information in Pth Object | x0,y0,z0, x1,y1,z1, x2,y2,z2,R,G,B |

FIG.14A

| Object ID | |
|---|---|
| Data Size | |
| Data set class code | 0x0003 |
| Meta data | ... |

| Time information | yyyy.mm.dd.hh.mm.ss.ff |
|---|---|
| Data Size | |
| Number of Points | |
| Point coordination | x,y,z,R,G,B |
| ... | |
| Point coordination | x,y,z,R,G,B |

FIG.14B

| Object ID | |
|---|---|
| Data Size | |
| Data set class code | 0x0004 |
| Meta data | ... |

| Time information | yyyy.mm.dd.hh.mm.ss.ff |
|---|---|
| Data Size | |
| Number of Polygon | |
| Polygon information | x0,y0,z0, x1,y1,z1, x2,y2,z2,R,G,B |
| ... | |
| Polygon information | x0,y0,z0, x1,y1,z1, x2,y2,z2,R,G,B |

FIG.14C

| Object ID | |
|---|---|
| Data Size | |
| Data set class code | 0x0005 |
| Meta data | ... |

| Time information | yyyy.mm.dd.hh.mm.ss.ff |
|---|---|
| Data Size | |
| Number of Camera | C |
| Camera ID of 1st Camera | |
| Data Size of Distance image of 1st Camera | |
| Distance Image data of 1st Camera | |
| ... | |
| Camera ID of Cth Camera | |
| Data Size of Distance image of Cth Camera | |
| Distance Image data of Cth Camera | |

FIG.15
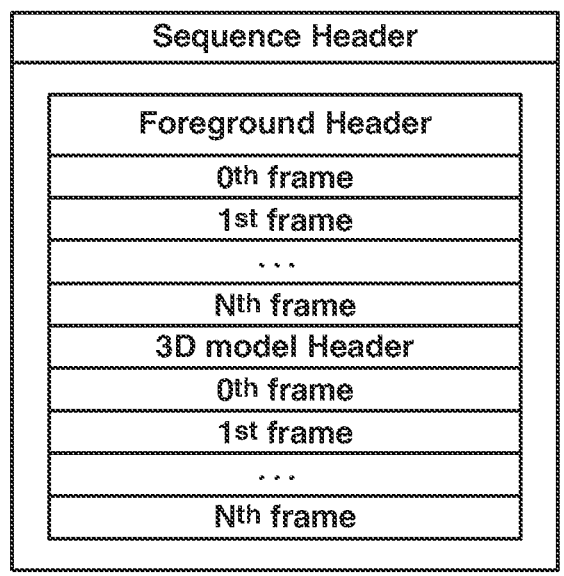
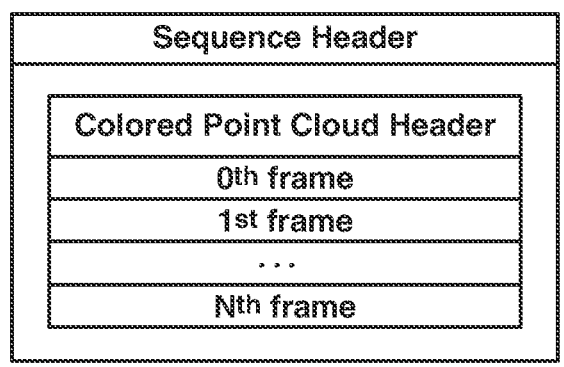
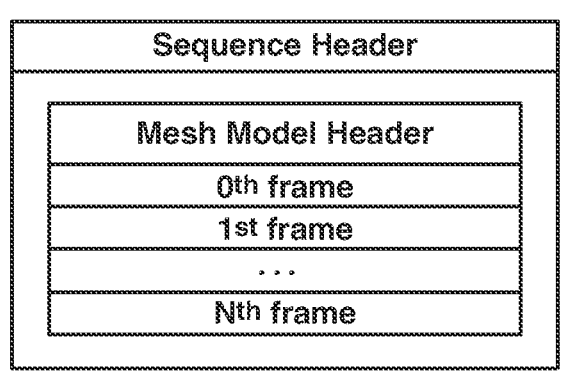

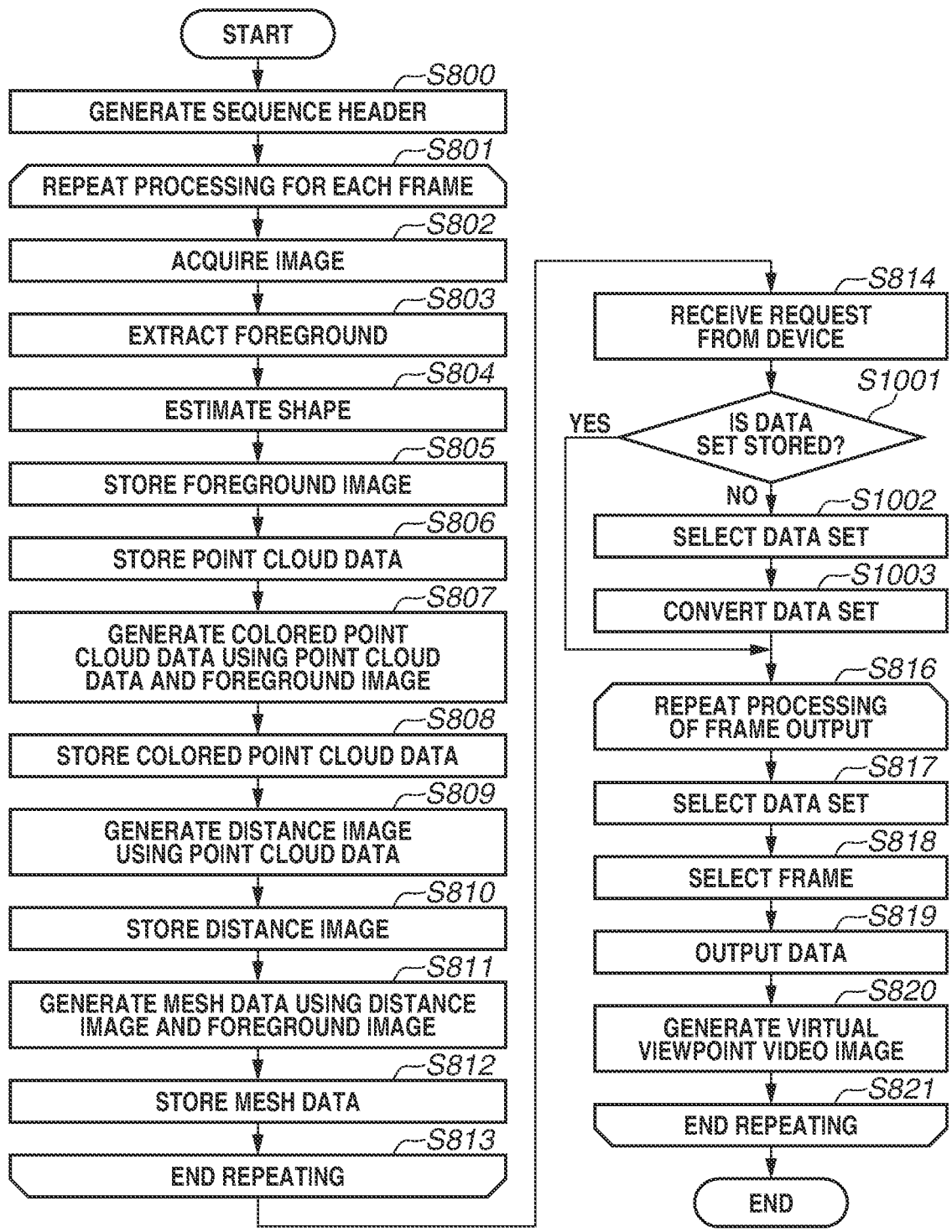

FIG.22A

| Billboard Header |
| --- |
| 0th frame |
| 1st frame |
| ... |
| Nth frame |

FIG.22B

| | |
| --- | --- |
| Time Information | yyyy:mm:dd:hh:mm:ss.ff |
| Data Size | |
| Time Information | yyyy:mm:dd:hh:mm:ss.ff |
| Data Size | |
| Number of Object | P |
| Number of Camera | C |
| Data Size of billboard image of 1st Camera for 1st Object | |
| Polygon billboard of 1st Camera | |
| Foreground Image of 1st Camera for 1st Object | Image Data |
| Data Size of billboard image of 2nd Camera for 1st Object | |
| Polygon billboard of 2nd Camera for 1st Object | |
| Foreground Image of 2nd Camera for 1st Object | Image Data |
| ... | |
| Data Size of billboard image of Cth Camera for 1st Object | |
| Polygon billboard of Cth Camera for 1st Object | |
| Foreground Image of Cth Camera for 1st Object | Image Data |
| ... | |
| Data Size of billboard image of Cth Camera for Pth Object | |
| Polygon billboard of Cth Camera for Pth Object | |
| Foreground Image of Cth Camera for Pth Object | Image Data |

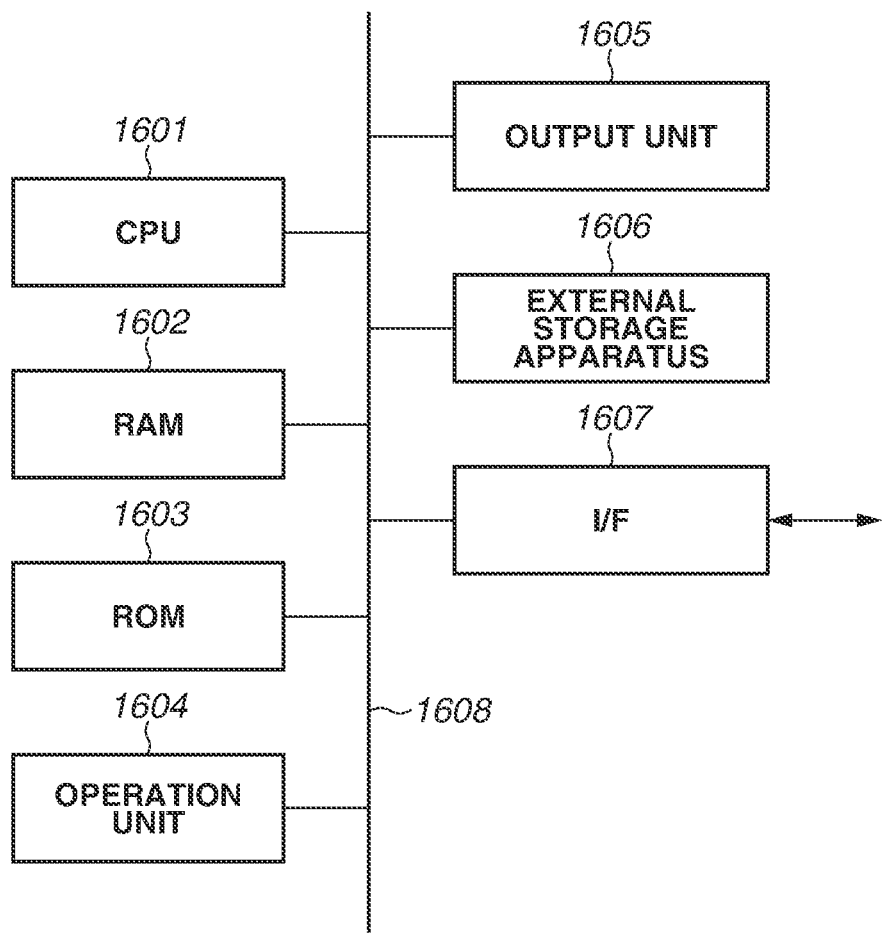

INFORMATION PROCESSING APPARATUS, INFORMATION PROCESSING METHOD, AND STORAGE MEDIUM

CROSS-REFERENCE TO RELATED APPLICATIONS

This application is a Continuation of International Patent Application No. PCT/JP2022/002977, filed Jan. 27, 2022, which claims the benefit of Japanese Patent Application No. 2021-024137, filed Feb. 18, 2021, both of which are hereby incorporated by reference herein in their entirety.

BACKGROUND OF THE INVENTION

Field of the Invention

The present disclosure relates to an information processing apparatus, an information processing method, and a storage medium.

Background Art

In recent years, techniques for imaging an object using a plurality of imaging apparatuses disposed around an imaging region and generating an image (virtual viewpoint image) viewed from a designated viewpoint (virtual viewpoint) using a plurality of captured images acquired from the plurality of imaging apparatuses have drawn attention. The techniques enable users to view, for example, highlight scenes of soccer or basketball from various angles and enjoy an enhanced realistic sensation compared to normal images. Patent Document (PTL) 1 discusses a system for generating point cloud data including a plurality of points indicating three-dimensional positions as three-dimensional shape data representing a shape of an object. Further, the system discussed in PTL 1 generates an image (virtual viewpoint image) viewed from a viewpoint by performing rendering processing using the generated point cloud data. Patent Document (PTL) 2 discusses a technique for reconstructing a three-dimensional model of a wide region including not only a front region but also side regions of an object based on information acquired from a red-green-glue-depth (RGB-D) camera. According to PTL 2, an object region is extracted based on depth data of a depth map, and a three-dimensional surface model for the object is generated based on the depth data. Further, according to PTL 2, a virtual viewpoint image is generated by performing rendering processing using a three-dimensional mesh model generated using the three-dimensional surface model.

CITATION LIST

Patent Literature

PTL 1: International Publication No. 2018/147329
PTL 2: Japanese Patent Laid-Open No. 2016-71645

As described above, there is a plurality of virtual viewpoint image generation methods, and the plurality of virtual viewpoint image generation methods uses data pieces different from each other. Thus, in a case where data output to an apparatus that is to perform processing for generating a virtual viewpoint image is not supported by the apparatus, the data may not be processed appropriately.

SUMMARY OF THE INVENTION

The present disclosure addresses the above-described issue and is directed to outputting, to a data output destination apparatus, material data for generating a virtual viewpoint image in a format processable by the data output destination apparatus.

According to an aspect of the present invention, an information processing apparatus includes an acquisition unit configured to acquire a plurality of material data for use in generation of a virtual viewpoint image based on a plurality of images captured with a plurality of imaging apparatuses by imaging an object, the plurality of material data including first material data and second material data different from the first material data, and an output unit configured to output, to another apparatus serving as a material data output destination, material data that is selected based on information for identifying a format of material data from which the other apparatus is able to generate the virtual viewpoint image, from among the plurality of material data acquired by the acquisition unit.

Further features of the present invention will become apparent from the following description of exemplary embodiments with reference to the attached drawings.

BRIEF DESCRIPTION OF THE DRAWINGS

FIGS. 2A to 2E are diagrams each illustrating an example of a data structure of material data stored in a storage unit.

FIGS. 3A to 3C are diagrams each illustrating an example of a data structure of material data stored in the storage unit.

FIGS. 4A and 4B are diagrams each illustrating an example of a data structure of material data stored in the storage unit.

FIGS. 5A and 5B are diagrams each illustrating an example of a data structure of material data stored in the storage unit.

FIGS. 6A to 6C are diagrams each illustrating an example of a data structure of material data stored in the storage unit.

FIGS. 7A and 7B are diagrams illustrating examples of a data structure of material data stored in the storage unit.

FIG. 14A is a diagram illustrating an example of a data structure of material data stored in the storage unit.

FIG. 14B is a diagram illustrating an example of a data structure of material data stored in the storage unit.

FIG. 14C is a diagram illustrating an example of a data structure of material data stored in the storage unit.

FIG. 15 is a diagram illustrating an example of a data structure of material data stored in the storage unit.

FIG. 21 is a flowchart illustrating an example of a process that is performed by the virtual viewpoint image generation system according to the third exemplary embodiment.

FIGS. 22A and 22B are diagrams each illustrating an example of a data structure of material data stored in the storage unit.

FIG. 23 is a block diagram illustrating an example of a hardware configuration of the information processing apparatus.

DESCRIPTION OF THE EMBODIMENTS

Figure 1:
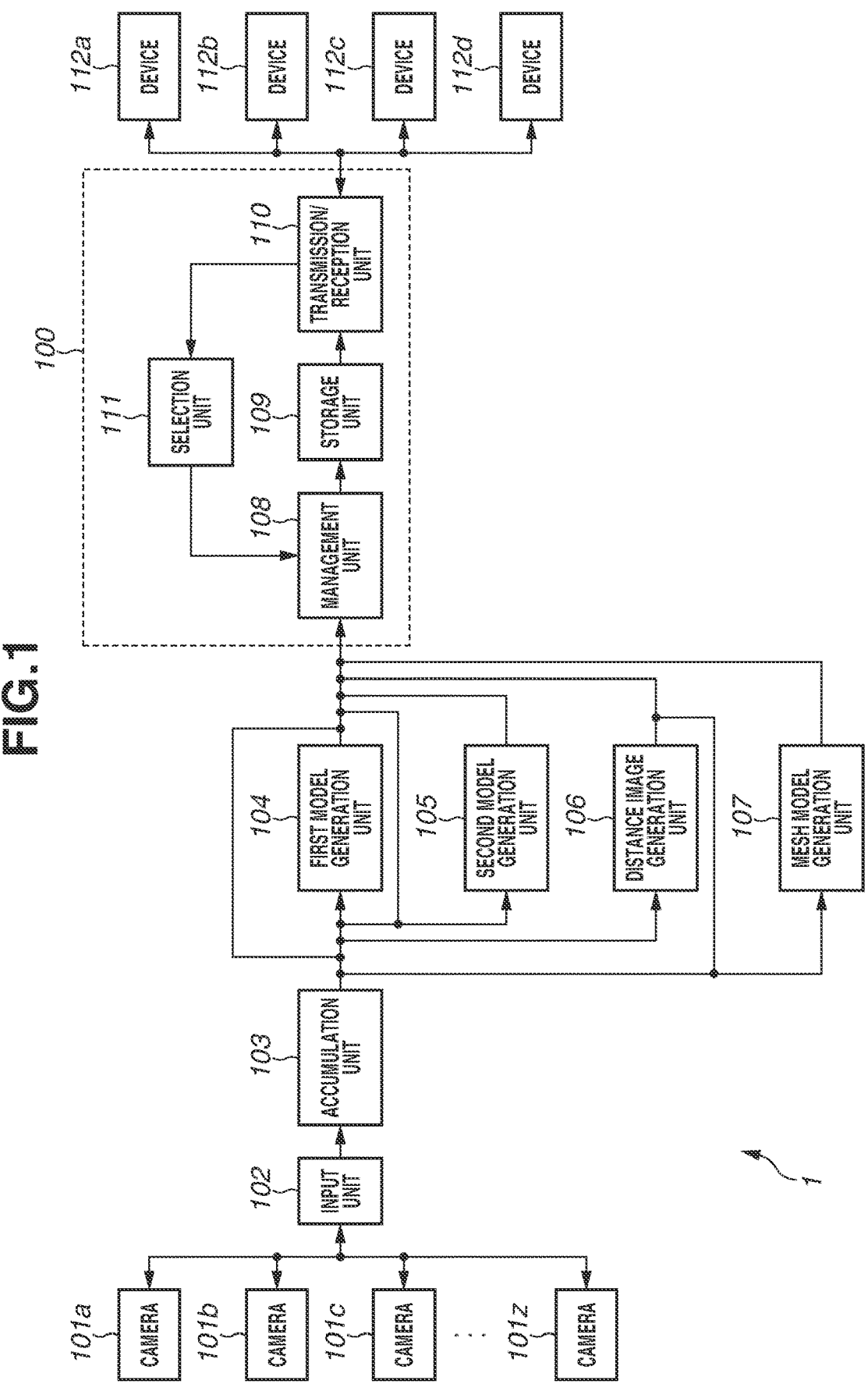
FIG. 1 is a diagram illustrating an example of a configuration of a virtual viewpoint image generation system including an information processing apparatus according to a first exemplary embodiment.

Various exemplary embodiments of the present disclosure will be described below with reference to the drawings. It is to be noted that components according to the exemplary embodiments described below are merely examples of the exemplary embodiments and are not intended to limit the present disclosure to the components.

First Exemplary Embodiment

In the present exemplary embodiment, a description will be given of an information processing apparatus that outputs, to a display apparatus, data (hereinafter, referred to as "material data") for use in virtual viewpoint image generation based on a plurality of images captured with a plurality of imaging apparatuses by imaging an object.

FIG. 23 is a block diagram illustrating an example of a hardware configuration of a computer applicable to the information processing apparatus according to the present exemplary embodiment. The information processing apparatus includes a central processing unit (CPU) 1601, a random access memory (RAM) 1602, a read-only memory (ROM) 1603, an operation unit 1604, an output unit 1605, an external storage apparatus 1606, an interface (I/F) 1607, and a bus 1608. The hardware configuration illustrated in FIG. 23 is also applicable to any apparatus of a virtual viewpoint image generation system described below.

The CPU 1601 controls the entire computer using computer programs and data that are stored in the RAM 1602 or the ROM 1603. The RAM 1602 includes an area for temporarily storing computer programs and data loaded from an external storage apparatus 806 and data acquired from external sources via the I/F 1607. The RAM 1602 further includes a work area for use by the CPU 1601 in performing various types of processing. Specifically, the RAM 1602 allocates a frame memory and provides other various areas as needed, for example.

The ROM 1603 stores setting data on the apparatus and a boot program. The operation unit 1604 includes input apparatuses, such as a keyboard, a mouse, and a joystick, and various instructions based on user operations performed using the input apparatuses are input to the CPU 1601. The output unit 1605 outputs results of processing by the CPU 1601. The output unit 1605 includes, for example, a liquid crystal display.

The external storage apparatus 1606 can be an information storage apparatus, such as a hard disk drive apparatus. The external storage apparatus 1606 stores an operating system (OS) and computer programs that cause the CPU 1601 to realize functions of processing units of the apparatus according to the present exemplary embodiment. The computer programs and data stored in the external storage apparatus 1606 are loaded to the RAM 1602 under control of the CPU 1601 and are to be processed by the CPU 1601. The external storage apparatus 1606 can also store processing target image data and various types of information for use in processing.

Networks, such as a local area network (LAN) and the Internet, and other devices, such as a projection apparatus and a display apparatus, are able to be connected to the I/F 1607, and the computer acquires and transmits various types of information via the I/F 1607. For example, in a case where the information processing apparatus is connected to an external apparatus via wires, a cable for communication is connected to the I/F 1607. In a case where the information processing apparatus has a function of wirelessly communicating with external apparatuses, the I/F 1607 includes an antenna. The bus 1608 is a bus connecting the foregoing components to each other.

At least one of the above-described components can be served as a separate external apparatus and is connected to the information processing apparatus. The same applies to any apparatus of the virtual viewpoint image generation system described below.

<Configuration of Virtual Viewpoint Image Generation System>

Next, a configuration of the virtual viewpoint image generation system according to the present exemplary embodiment will be described below. It is to be noted that virtual viewpoint images according to the present exemplary embodiment are also referred to as free viewpoint images but are not limited to images corresponding to a viewpoint designated freely (as desired) by a user and, for example, images corresponding to a viewpoint selected from a plurality of candidates by the user are also included in the virtual viewpoint images. While, in the present exemplary embodiment, mainly a case where a virtual viewpoint is designated by a user operation will be described below, the virtual viewpoint designation can be performed automatically based on an image analysis result. Further, while, in the present exemplary embodiment, mainly a case where a virtual viewpoint image is a moving image will be described below, a virtual viewpoint image can be a still image.

FIG. 1 is a diagram illustrating a configuration of a virtual viewpoint image generation system 1. The virtual viewpoint image generation system 1, for example, captures object images using a plurality of imaging apparatuses installed in a facility, such as a stadium or a concert hall, and generates data (material data) for generating a virtual viewpoint image based on the plurality of captured images. The virtual viewpoint image generation system 1 includes cameras 101a to 101z, an input unit 102, an accumulation unit 103, a first model generation unit 104, a second model generation unit 105, a distance image generation unit 106, a mesh model generation unit 107, an information processing apparatus 100, and devices 112*a* to 112*d*. A functional configuration of the information processing apparatus 100 will be described below.

The cameras 101*a* to 101*z* are disposed at positions surrounding an object and perform imaging in synchronization with each other. The number of cameras is not limited to the number of cameras illustrated in FIG. 1. The cameras 101*a* to 101*z* are connected to each other via a network and are connected to the input unit 102. The cameras 101*a* to 101*z* perform imaging in synchronization with each other. Specifically, frames of images captured individually by the cameras 101*a* to 101*z* are acquired at the same time. Time information about the imaging time and frame numbers are added to the acquired captured images, and the captured images with the time information and the frame numbers are transmitted to the input unit 102. Any format can be used for the time information. Further, each of the cameras 101*a* to 101*z* is given a camera identity (camera ID), and the camera ID information is added to each captured image acquired by the cameras. Hereinafter, unless the cameras 101*a* to 101*z* need to be discriminated from each other, the cameras 101*a* to 101*z* will be referred to simply as "camera 101".

The input unit 102 receives input image data obtained by the imaging with the cameras 101*a* to 101*z* and outputs the input image data to the accumulation unit 103. The accumulation unit 103 is temporarily accumulates the input image data.

The first model generation unit 104, the second model generation unit 105, the distance image generation unit 106, and the mesh model generation unit 107 are each a processing unit that generates material data for use in generation of a virtual viewpoint image. Material data in the present exemplary embodiment is data for use in generation of a virtual viewpoint image and is generated based on the captured images. Material data is, for example, foreground image data extracted from the captured images, background image data extracted from the captured images, a model (hereinafter, also referred to as "three-dimensional shape data") representing a shape of an object in a three-dimensional space, and texture data for coloring the three-dimensional shape data. Different material data may be needed for different virtual viewpoint image generation methods. Details thereof will be described below.

The first model generation unit 104 generates, as material data, point cloud data representing three-dimensional shapes of objects and foreground images, based on input image data. The foreground images are images generated by extracting regions corresponding to respective object (e.g., player, ball) from the captured images. The first model generation unit 104, for example, captures images without objects as reference images and extracts regions corresponding to respective objects using differences from the input image data (captured images). Further, the first model generation unit 104 generates silhouette images by assigning a pixel value of 1 to the regions corresponding to the objects and a pixel value of 0 to the other regions, based on results of the object region extraction.

Furthermore, the first model generation unit 104 uses the generated silhouette images to generate point cloud data by using shape-from-silhouette. The generated point cloud data is data that represents three-dimensional shapes of the objects using a set of a plurality of points each having coordinate information in the three-dimensional space. Further, the first model generation unit 104 calculates circumscribed rectangles of the extracted object regions, cuts regions corresponding to the circumscribed rectangles from the captured images, and generates the cut regions as foreground images. The foreground images are to be used as texture data for coloring three-dimensional shape data in generating a virtual viewpoint image. Methods for generating point cloud data and foreground images are not limited to the above-described methods, and any generation methods can be used.

The second model generation unit 105 generates, as material data, data (hereinafter, "colored point cloud data") including point clouds representing the three-dimensional shapes of the objects and color information about the objects. The colored point cloud data is generated using the point cloud data generated with the first model generation unit 104 and the images, which has been captured by the cameras 101 and acquired from the accumulation unit 103, or the foreground images. The second model generation unit 105 identifies, for each point included in the point cloud data, a color (pixel value) in the captured images acquired with the cameras 101 which captures images of three-dimensional positions corresponding to the respective points. The second model generation unit 105 associates the identified colors with the respective points to generate colored point cloud data having the color information. The second model generation unit 105 can generate colored point cloud data by using the image data acquired from the accumulation unit 103 without using the point cloud data generated by the first model generation unit 104.

The distance image generation unit 106 generates, as material data, distance images that represents distances from the cameras 101 to the objects. The distance image generation unit 106 uses, for example, a stereo matching method to calculate parallaxes between the plurality of captured images and determines pixel values of the distance images based on the parallax data to generate distance images. Distance image generation methods are not limited to the foregoing method. For example, the distance image generation unit 106 can use the point cloud data generated by the first model generation unit 104 and calculate distances from the three-dimensional positions of the respective points of the point cloud data to the cameras 101, to generate distance images. Alternatively, the distance image generation unit 106 can use distance cameras using infrared sensors to separately acquire distance images.

The mesh model generation unit 107 generates, as material data, mesh data that represents the three-dimensional shapes of the objects, based on the image data acquired from the accumulation unit 103. The mesh model generation unit 107 generates mesh data, which is an aggregation of a plurality of polygons, by using, for example, a method discussed in PTL 2. When the method is used, the distance image data generated by the distance image generation unit 106 is used as a depth map. Mesh data generation methods are not limited to the foregoing method. For example, the mesh model generation unit 107 can convert the point cloud data generated by the first model generation unit 104 and the colored point cloud data generated by the second model generation unit 105, to generate mesh data.

The first model generation unit 104, the second model generation unit 105, the distance image generation unit 106, and the mesh model generation unit 107 can, for example, be included in a single apparatus or be connected as a different apparatus from each other. Alternatively, a plurality of apparatuses each including a combination of any of the foregoing generation units can be used. For example, a first generation apparatus including the first model generation unit 104 and the second model generation unit 105 and a second generation apparatus including the distance image generation unit 106 and the mesh model generation unit 107 can be connected to each other. Alternatively, at least one of the foregoing generation units or a processing unit for performing part of the processing of the foregoing generation units can be included in the cameras 101 and other apparatuses, such as the information processing apparatus 100 described below. For example, the silhouette image generation processing and/or the foreground image generation processing of the first model generation unit 104 can be performed by the cameras 101. In this case, the cameras 101 add various types of information, such as time information, frame numbers, and camera IDs, to the silhouette images and/or the foreground images generated based on the captured images and transmit the silhouette images and/or the foreground images with the added information to the input unit 102.

The devices 112a to 112d are display apparatuses that acquire material data from the information processing apparatus 100 described below, generate a virtual viewpoint image based on the material data, and display the generated virtual viewpoint image. The devices 112a to 112d may be, for example, a personal computer (PC), a smartphone, and a tablet. Hereinafter, unless the devices 112a to 112d need to be discriminated from each other, the devices 112a to 112d will be referred to simply as "device(s) 112".

Next, a functional configuration of the information processing apparatus 100 of the virtual viewpoint image generation system 1 will be described below with reference to FIG. 1. The information processing apparatus 100 includes a management unit 108, a storage unit 109, a transmission/reception unit 110, and a selection unit 111.

The management unit 108 acquires a plurality of material data generated by the first model generation unit 104, the second model generation unit 105, the distance image generation unit 106, and the mesh model generation unit 107 and stores the plurality of acquired material data in the storage unit 109. When the data is stored, a table for data access to read out the data is generated to manage the data so that the data can be read and written in association with time information and frame numbers. Further, the data is output based on instructions from the selection unit 111 described below.

The storage unit 109 stores the input material data. The storage unit 109 corresponds to the external storage apparatus 1606 in FIG. 23 and includes a semiconductor memory and/or a magnetic recording apparatus. Formats (formats) of the material data in storing will be described below. Writing and reading of the data are performed based on instructions from the management unit 108, and the written data is output to the transmission/reception unit 110 based on read instructions.

The transmission/reception unit 110 communicates with the devices 112 described below and receives requests and data from the devices 112 and transmits data to the devices 112. The selection unit 111 selects, from among the plurality of material data, material data to be transmitted to the display apparatuses connected to the information processing apparatus 100. Operations thereof will be described below. The selection unit 111 transmits a selected material data output instruction to the management unit 108.

The devices 112a to 112d acquire the material data from the information processing apparatus 100. Further, the devices 112a to 112d receive user operations for virtual viewpoint designation and generate virtual viewpoint images corresponding to the designated virtual viewpoint based on the material data. Further, the devices 112a to 112d display the generated virtual viewpoint images. According to the present exemplary embodiment, the device 112a generates a virtual viewpoint image using the foreground images and the point cloud data. The device 112b generates a virtual viewpoint image using the colored point cloud data. The device 112c generates a virtual viewpoint image using the foreground images and the distance images. The device 112d generates a virtual viewpoint image using the mesh data.

As described above, material data to be used in generating a virtual viewpoint image may differ depending on a type of a device. An example of a possible cause of the difference of the material data to be used is that different devices use different methods or different types of software for generating a virtual viewpoint images. Further, another possible cause is that different devices support material data formats different from each other. Yet another possible cause is that different devices have different display capabilities and different processing capabilities. For example, a device can display a virtual viewpoint image based on mesh data but cannot display a virtual viewpoint image based on point cloud data. The foregoing issues may arise an issue that in a case where material data corresponding to a virtual viewpoint image not processable for display by a device is provided to the device, the device cannot display the virtual viewpoint image appropriately. In order to solve the issue, the information processing apparatus 100 according to the present exemplary embodiment selects, from among the plurality of material data, material data to be transmitted, based on a class of a virtual viewpoint image processable for display by a device serving as a display apparatus, and outputs the selected material data. Details of the processing will be described below.

<Examples of Material Data Formats>

FIGS. 2A to 2E illustrate examples of formats of the three-dimensional shape data stored in the storage unit 109. Material data is stored as a sequence corresponding to a single aggregation, as illustrated in FIG. 2A. A sequence can be generated for, for example, each imaging period, each imaged game, or each event or cut during the game. The management unit 108 manages the data on a sequence-by-sequence basis. Each sequence includes a sequence header (Sequence Header). The sequence header stores a sequence header start code (Sequence Header Start Code) indicating a beginning of the sequence, as illustrated in FIG. 2B. Next, information about the entire sequence is stored. For example, a sequence name, an imaging location, time information indicating an imaging start date and time, a frame rate, and an image size are stored. The sequence name describes information for identifying the sequence, such as a name of the game or the event.

The sequence stores the three-dimensional shape data in units of data sets (Data Set). The sequence header describes the number of data sets (Number of Data set) M. Next, information is stored on a data set-by-data set basis. In the information by the unit of data set, first, an identification ID is provided to each data set. Each identification ID is a unique ID in the storage unit 109 or in all the data sets. Next, a class of the data set is stored. In the present exemplary embodiment, classes of data set include the point cloud data, the foreground images, the colored point cloud data, the distance image data, and the mesh data. Each of them is expressed as a data set class code. The data set class codes (Data set class code) are expressed as 2-byte codes illustrated in FIG. 2E. The data classes and data codes are not limited to those described above. Other data representing the three-dimensional shape data can also be used. Next, a pointer of the data set is stored. Any information for access to the data set can be used and information is not limited to the pointers. For example, the storage unit 109 can configure a file system, and a file name can be used.

Next, a format of each data set included in the sequence will be described below. In the present exemplary embodiment, the point cloud data, the foreground images, the colored point cloud data, the distance image data, and the mesh data will be described below as examples of the classes of the data sets.

FIGS. 3A to 3C illustrate an example of a configuration of a foreground image data set. While a case where the foreground image data set is stored on a frame-by-frame basis will be described below for description, this is not a limiting case. As illustrated in FIG. 3A, a foreground image data header is stored at the beginning of the data set. The header stores information indicating that the data set is a foreground image data set, and information about the number of frames.

FIG. 3B illustrates information included in the frames. Each frame stores time information (Time information) indicating the time of the first frame of the foreground image data and the data size (Data Size) of the frame. The data sizes are used to refer to data of a next frame and can be stored together in the header. Next, the number of objects (Number of Object) P for generating a virtual viewpoint image at the time indicated by the time information is stored. Next, the number of cameras (Number of Camera) C used in imaging at that time is stored. Next, the camera IDs (Camera ID of Cth Camera) of the cameras used are stored. Next, image data (1st Foreground Image of Cth Camera) on the foreground images including the objects is stored for each of the objects. At the beginning of the image data, a data size of the foreground image data, a foreground image size, a bit depth of pixel values, and the pixel values are stored in raster order, as illustrated in FIG. 3C. The foreground image data from the cameras is stored consecutively on an object-by-object basis. In a case where a camera captures no objects, null can be written, or camera IDs corresponding to the number of cameras C capturing an object can be stored on an object-by-object basis.

FIGS. 4A and 4B illustrate an example of a configuration of a data set of the point cloud data. While a case where the point cloud data sets are stored on a frame-by-frame basis will be described below for description, this is not a limiting case. A point cloud data header is stored at the beginning of the data set. As illustrated in FIG. 4A, the header stores information indicating that the data set is a point cloud data set, and information about the number of frames.

FIG. 4B illustrates information included in the frames. Each frame stores time information (Time information) indicating the time of the frame. Next, a data size (Data Size) of the frame is stored. The data sizes are used to refer to data of a next frame and can be stored together in the header. Next, the number of objects at the time indicated by the time information, i.e., the number of pieces of point cloud data (Number of Object) P, is stored. Next, the point cloud data on each of the objects is sequentially stored. First, the number of coordinate points forming a point cloud of the first object (Number of Points in 1st Object) is stored. Next, coordinates of the points (Point coordination in 1st Object) are stored. The point cloud data on the rest of the objects included at the time are stored similarly.

While, in the present exemplary embodiment, the coordinate system is stored as three-axis data, the coordinate system is not limited to that described above, and a polar coordinate or other coordinate systems can be used. Information indicating that data lengths of coordinate values are fixed can be described in the point cloud data header, or the point clouds can have a different data length from each other. In a case where the point clouds have a different data length from each other, a data size is stored for each point cloud. By referring to the data size, a storage location of a next point cloud can be identified from the number of coordinate points.

FIGS. 5A and 5B illustrate an example of a configuration of a data set of the colored point cloud data. While a case where the colored point cloud data set is stored on a frame-by-frame basis will be described below for description, this is not a limiting case. A colored point cloud data header is stored at the beginning of the data set. As illustrated in FIG. 5A, the header stores information indicating that the data set is a colored point cloud data set, and information about the number of frames.

FIG. 5B illustrates information included in the frames. In each frame of the point cloud data, time information (Time information) indicating the time of the frame is stored. Next, a data size (Data Size) of the frame is stored. The data sizes are used to refer to data on a next frame and can be stored together in the header. Next, the number of objects at the time indicated by the time information, i.e., the number of pieces of colored point cloud data (Number of Object) P, is stored. Next, the colored point cloud data on each object is sequentially stored. First, the number of coordinate points forming a point cloud of the first object (Number of Points in 1st Object) is stored. Next, coordinates of the points and color information about the points (Point coordination in Pth Object) are stored. The colored point cloud data on the rest of the objects included at the time are stored similarly.

While, in the present exemplary embodiment, the coordinate system is three-axis data and the color information is stored as values of three primary colors RGB, the coordinate system and the color information are not limited to those described above. A polar coordinate or other coordinate systems can be used. Further, the color information can be expressed as uniform color space information, luminance information, or chromaticity information. Further, information indicating that data lengths of coordinate values are fixed can be described in the colored point cloud data header, or the colored point clouds can have a different data length from each other. In a case where the colored point clouds have a different data length from each other, a data size is stored for each point cloud. By referring to the data size, a storage location of a next colored point cloud can be identified from the number of coordinate points.

FIGS. 6A to 6C illustrate an example of a configuration of a data set of the distance image data. While a case where the distance image data set is stored on a frame-by-frame basis will be described below for description, this is not a limiting case. A distance image data header is stored at the beginning of the data set. As illustrated in FIG. 6A, the header stores information indicating that the data set is a distance image data set, and information about the number of frames.

FIG. 6B illustrates information included in the frames. Each frame stores time information (Time information) indicating the time of the frame. Next, a data size (Data Size) of the frame is stored. The data sizes are used to refer to data on a next frame and can be stored together in the header. Since the distance image data is acquired on a camera-by-camera basis, the number of cameras (Number of Camera) C used in the frame is stored. Next, the camera IDs of the cameras (Camera ID of Cth Camera) are sequentially stored. Next, distance image data of the cameras (Distance Image of Cth Camera) is stored. At the beginning of the distance image data, a data size of the distance image data, a distance image size, a bit depth of pixel values, and the pixel values are stored in raster order, as illustrated in FIG. 6C. The distance image data from the cameras is stored consecutively. In a case where a camera captures no subjects, null can be written, or only camera IDs corresponding to the number of cameras C capturing an object can be stored on an object-by-object basis.

FIGS. 7A and 7B illustrate an example of a configuration of a data set of the mesh data. While a case where the mesh data set is stored on a frame-by-frame basis will be described below for description, this is not a limiting case. A mesh data header data set is stored at the beginning of the data set. As illustrated in FIG. 7A, the header stores information indicating that the data set is a mesh data set, and information about the number of frames.

FIG. 7B illustrates information included in the frames. Each frame stores time information (Time information) indicating the time of the frame. Next, a data size (Data Size) of the frame is stored. The data sizes are used to refer to data on a next frame and can be stored together in the header. Next, the number of objects (Number of Object) P is stored. Next, the mesh data is stored for each object. At the beginning of the mesh data for each object, the number of polygons forming the mesh data (Number of Points in Pth Object) is stored. Furthermore, the mesh data for each object stores data on each polygon, i.e., coordinates of vertices of the polygons and color information about the polygons (Polygon information in Pth Object). The mesh data for the rest of the objects included at the time is stored similarly.

While, in the present exemplary embodiment, the coordinate system describing the vertices is three-axis data and the color information is stored as values of three primary colors RGB, the coordinate system and the color information are not limited to those described above. A polar coordinate or other coordinate systems can be used. Further, the color information can be expressed as uniform color space information, luminance information, or chromaticity information. Further, while, in the present exemplary embodiment, the mesh data is in a format that assigns a single color to a single polygon, a format of the mesh data is not limited to that described above. For example, a method in which mesh data without color information is generated and polygon colors are determined using the foreground image data can be used. Further, the virtual viewpoint image generation system 1 can generate mesh data, without color information, and foreground images as material data separately from mesh data that assigns a single color to a single polygon. In a case where a virtual viewpoint image is to be generated using the mesh data that assigns a single color to a single polygon, polygon colors are determined independently of a position of a virtual viewpoint and a gaze direction from the virtual viewpoint. On the other hand, in a case where a virtual viewpoint image is to be generated using the mesh data, without color information, and the foreground images, polygon colors change depending on the position of the virtual viewpoint and the gaze direction from the virtual viewpoint.

Further, an existing format, such as a polygon file format (PLY) or standard triangle language (STL) format, can be used. An existing format is able to be used with a data set class code prepared in advance each corresponding to different formats.

<Operations of Virtual Viewpoint Image Generation System>

Figure 8:
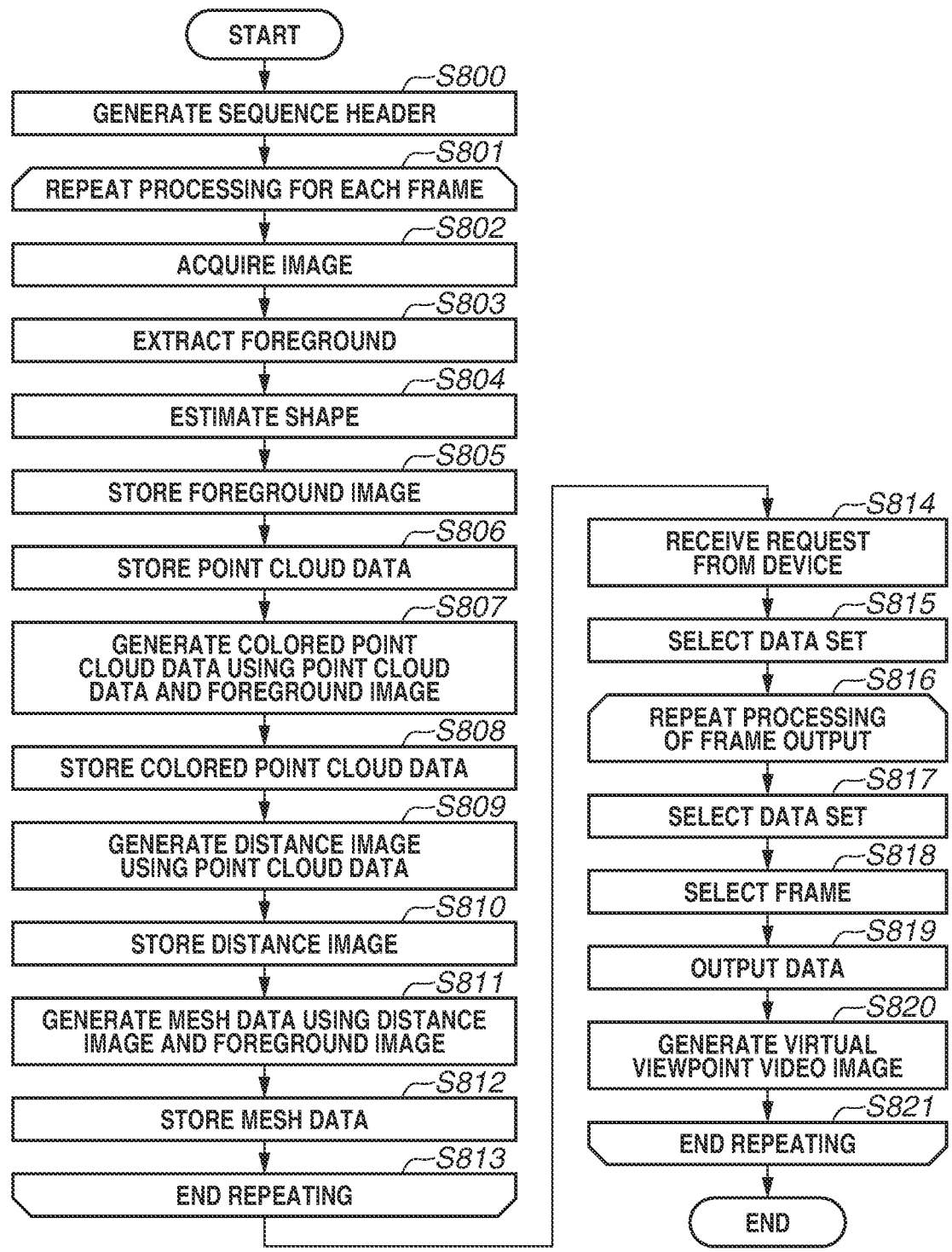
FIG. 8 is a flowchart illustrating an example of a process that is performed by the virtual viewpoint image generation system according to the first exemplary embodiment.

Next, operations of the virtual viewpoint image generation system 1 will be described below with reference to a flowchart in FIG. 8. A process in FIG. 8 is realized by the CPUs of the apparatuses of the virtual viewpoint image generation system 1 reading programs stored in the ROMs or external storage apparatuses and executing the read programs.

In step S800, the management unit 108 generates a sequence header of a format for material data storing. In this process, data sets to be generated by the virtual viewpoint image generation system 1 are determined. In step S801, the cameras 101 start imaging, and processes in steps S802 to S812 are performed repeatedly to process each frame of acquired captured images.

In step S802, the input unit 102 acquires captured image frame data from the cameras 101a to 101z and transmits the acquired captured image frame data to the accumulation unit 103. In step S803, the first model generation unit 104 generates foreground images and silhouette images based on the captured images acquired from the accumulation unit 103. In step S804, the first model generation unit 104 performs shape estimation using the generated silhouette images by a shape-from-silhouette method, for example, and generates point cloud data.

In step S805, the management unit 108 acquires the foreground images from the first model generation unit 104 and stores the acquired foreground images in the storage unit 109 in the formats illustrated in FIGS. 2 and 3. Further, the management unit 108 updates the stored data on values that change through the repeat processing, such as the number of frames in the foreground image data set header. In step S806, the management unit 108 acquires the point cloud data from the first model generation unit 104 and stores the point cloud data in the formats illustrated in FIGS. 2 and 4. Further, the management unit 108 updates the data, such as the number of frames, in the point cloud data set header.

In step S807, the second model generation unit 105 generates colored point cloud data using the point cloud data and the foreground image data generated by the first model generation unit 104. In step S808, the management unit 108 acquires the colored point cloud data from the second model generation unit 105 and stores the acquired colored point cloud data in the storage unit 109 in the formats illustrated in FIGS. 2 and 5. Further, the management unit 108 updates the data, such as the number of frames, in the colored point cloud data set header.

In step S809, the distance image generation unit 106 generates distance image data for each of the cameras 101 using the point cloud data generated by the first model generation unit 104. In step S810, the management unit 108 acquires the distance images from the distance image generation unit 106 and stores the acquired distance images in the storage unit 109 in the formats illustrated in FIGS. 2 and 6. Further, the management unit 108 updates the data, such as the number of frames, in the distance image data set header.

In step S811, the mesh model generation unit 107 generates mesh data using the distance image data generated by the distance image generation unit 106 and the foreground image data. In step S812, the management unit 108 acquires the mesh data from the mesh model generation unit 107 and stores the acquired mesh data in the storage unit 109 in the formats illustrated in FIGS. 2 and 7. Further, the management unit 108 updates the data, such as the number of frames, in the mesh data set header. In step S813, the virtual viewpoint image generation system 1 performs determination of whether to end the repeat processing. For example, the repeat processing is ended in a case where the imaging by the cameras 101 is ended or the processing on a predetermined number of frames is ended.

In step S814, a material data request is received from a device 112. Further, the transmission/reception unit 110 acquires information for identifying a format of material data processable by the device 112 that is to display a virtual viewpoint image. A case where the device can process material data herein is a case where the device 112 can interpret data contained in a file of acquired material data and can process the data appropriately based on the content described in the data. For example, in a case where a format of a file of material data is not supported by the device 112 and cannot be read by the device 112, it is understood that the material data is not processable by the device 112. Further, a case where the device 112 is able to process material data is a case where the device 112 can generate a virtual viewpoint image based on the acquired material data. While, in the present exemplary embodiment, the phrase "identifies a 'format' of material data" is used, any other term such as "type", "structure", or "format" of material data can be used.

The information to be acquired may contain, for example, information about specifications and a type of the device 112 and processing capability information about the device 112. Further, for example, the information to be acquired may contain, for example, information about a virtual viewpoint image generation method that the device 112 uses and information about software to be used to generate or reproduce a virtual viewpoint image. Further, the information to be acquired may contain, for example, information about a virtual viewpoint image format processable for display by the device 112. The transmission/reception unit 110 transmits the acquired information to the selection unit 111. The selection unit 111 selects material data to be output to the display apparatus from the plurality of material data stored in the storage unit 109, based on the acquired information.

For example, the information processing apparatus 100 selects a foreground image data set and a point cloud data set for the device 112 that generates a virtual viewpoint image from among pieces of the foreground image data and the point cloud data, such as the device 112a. Further, the information processing apparatus 100 selects a colored point cloud data set for the device 112 that generates a virtual viewpoint image from the colored point cloud data, such as the device 112b. Further, the information processing apparatus 100 selects a distance image data set and a foreground image data set for the device 112 that generates a virtual viewpoint image from among pieces of the distance image data and the foreground image data, such as the device 112c. Further, the information processing apparatus 100 selects a mesh data set based on the class of the data set for a device 112 that includes a renderer for rendering mesh data, such as the device 112d. As described above, the information processing apparatus 100 operates such that different types of material data are output in accordance with the device 112.

Information that the transmission/reception unit 110 acquires from the device 112 is not limited to those described above and can be, for example, information that specifies particular material data, such as the point cloud data. Further, the information processing apparatus 100 can hold, in an external storage apparatus in advance, a table associating the types of the plurality of devices 112 with material data to be output for each device 112, and the selection unit 111 can be configured to acquire the table. In this case, the information processing apparatus 100 selects material data described in the acquired table in a case where a connection of the device 112 is confirmed.

In step S815, the transmission/reception unit 110 receives information about a virtual viewpoint image to be generated. The virtual viewpoint image information contains information for use in selection of a sequence for virtual viewpoint image generation. The information for use in selection of a sequence includes, for example, at least one of a sequence name, an imaging time and date, and time information about the first frame for virtual viewpoint image generation. The transmission/reception unit 110 outputs the virtual viewpoint image information to the selection unit 111.

The selection unit 111 outputs information about the selected sequence data, e.g., sequence name, to the management unit 108. The management unit 108 selects sequence data corresponding to the input sequence name. The selection unit 111 outputs, to the management unit 108, time information about the first frame for virtual viewpoint image generation. The management unit 108 compares the time information about the imaging start time of the data set and the input time information about the first frame for virtual viewpoint image generation and selects a frame of the first frame. For example, in a case where the time information about the imaging start time of the sequence indicates Apr. 1, 2021, 10:32:42:00 and the time information about the first frame for virtual viewpoint image generation is Apr. 1, 2021, 10:32:43:40, 100-frame data reading is skipped. This is realized by calculating the beginning of the data of the frame to be read, based on the data sizes of the frames of the data sets.

In step S816, the information processing apparatus 100) and the device 112 repeat steps S817 to S820 until the last frame of a virtual viewpoint image to be generated is processed.

In step S817, the selection unit 111 selects a data set to be stored in the storage unit 109 based on the class of the data set to be used for virtual viewpoint image generation that is input in step S814. In step S818, the management unit 108 selects material data corresponding to frames to be read sequentially. In step S819, the storage unit 109 outputs the selected material data to the transmission/reception unit 110, and the transmission/reception unit 110 outputs the material data to the device 112 that is to generate a virtual viewpoint image. In step S820, the device 112 generates a virtual viewpoint image, based on the received material data and the virtual viewpoint set by the user operation and displays the generated virtual viewpoint image. In a case of the device that generates a virtual viewpoint video image by using the foreground image data and the point cloud data, such as the device 112a, positions of the respective points of the point cloud data are first identified in a virtual viewpoint image. Further, the pixel values corresponding to the positions of the respective points are colored by projecting the foreground image data, whereby a virtual viewpoint image is generated. In a method of generating a virtual viewpoint image using the foreground image data and the point cloud data, colors to be applied to the respective points are changed based on the position of the virtual viewpoint and the gaze direction from the virtual viewpoint. In a case of the device that generates a virtual viewpoint image using the colored point cloud data, such as the device 112b, the positions of the respective points of the point cloud data are first identified in a virtual viewpoint video image. The pixel values corresponding to the identified positions of the respective points are colored with colors associated with the respective points, whereby a virtual viewpoint image is generated. In a method of generating a virtual viewpoint image using the colored point clouds, since the colors corresponding to the respective points are fixed, the predetermined colors are applied independently of the position of the virtual viewpoint and the gaze direction from the virtual viewpoint.

In a case of the device that generates a virtual viewpoint image using the distance image data and the foreground image data, such as the device 112c, positions of objects on a virtual viewpoint image is identified using the plurality of distance image data, and a virtual viewpoint image is generated by texture mapping using the foreground images. In a case of the device that generates a virtual viewpoint image using the polygon data, such as the device 112d, a virtual viewpoint image is generated by pasting color values and images on planes visible from the virtual viewpoint, as in normal computer graphics.

In step S821, the virtual viewpoint image generation system 1 performs determination of whether to end the repeat processing. For example, in a case where the virtual viewpoint image generation is ended or the processing on a predetermined number of frames is ended, the repeat processing is ended.

Figure 10:
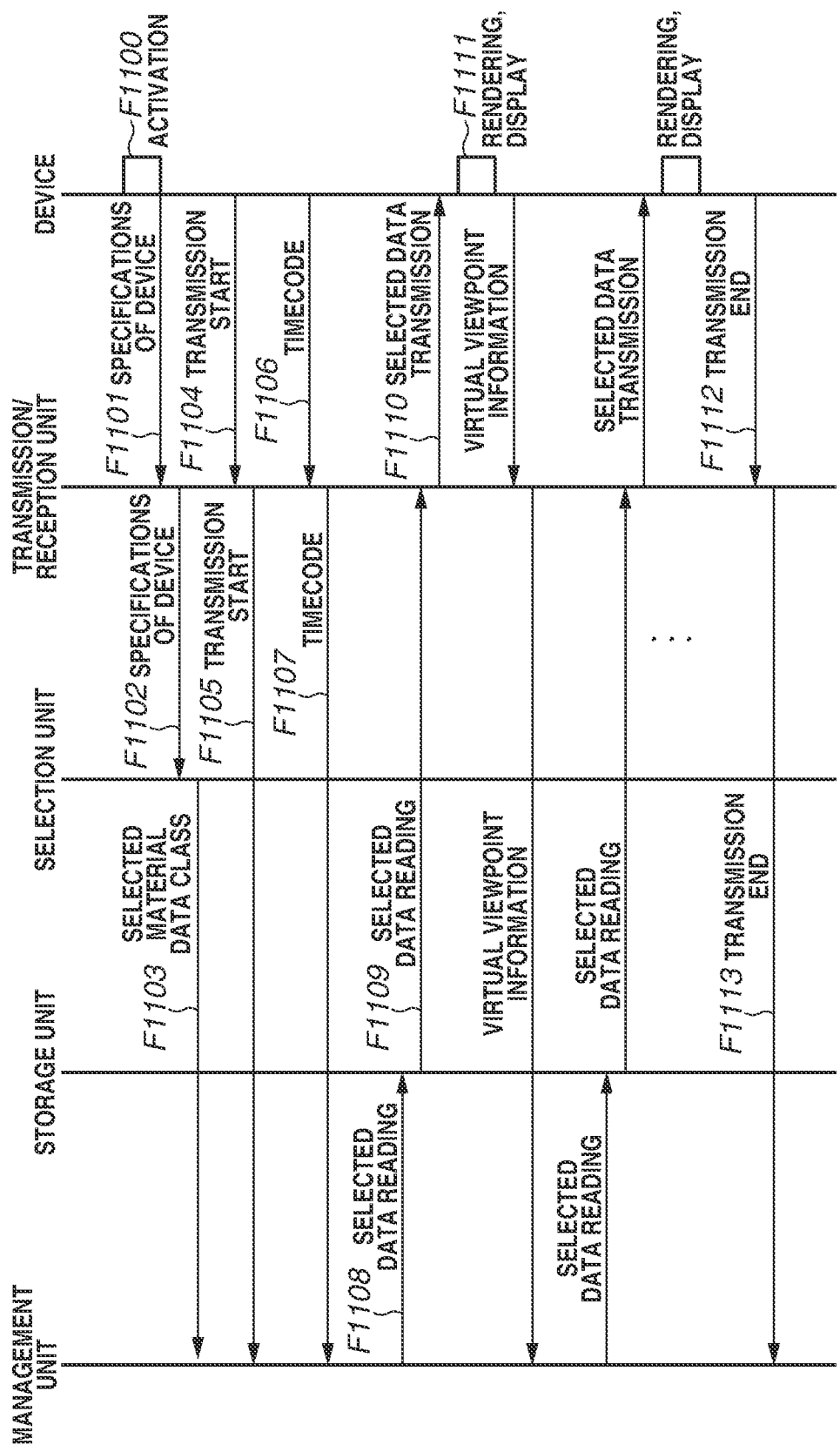
FIG. 10 is a diagram illustrating an example of communication that is performed by the virtual viewpoint image generation system.

FIG. 10 is a sequence diagram illustrating communication states of the processing units. First, in F1100, the device 112 is activated, and the device 112 acquires information about, for example, a virtual viewpoint image generation renderer of the device 112. In F1101, the device 112 transmits the acquired device information to the information processing apparatus 100. While the information transmitted from the device 112 herein is information about specifications of the device 112, any one of the above-described information can be transmitted.

In F1102, the transmission/reception unit 110 transmits the specifications of the device 112 to the selection unit 111. The selection unit 111 selects a data set of material data that can be rendered by the device 112 based on the transmitted information. In F1103, the selection unit Ill notifies the management unit 108 of the class of the selected data set. In this processing, the selection unit 111, for example, stores the class codes of material data in advance and transmits the class code of the class of the selected material data to the management unit 108. Further, in F1104, the device 112 outputs a transmission start request for data to the information processing apparatus 100, and in F1105, the transmission/reception unit 110 transmits a transmission start request to the management unit 108 via the selection unit 111.

In F1106, time information about a frame for starting a virtual viewpoint image is transmitted from the device 112 to the information processing apparatus 100, and in F1107, the time information is input to the management unit 108 via the transmission/reception unit 110 and the selection unit 111. In F1108, the management unit 108 transmits, to the storage unit 109, designation of reading frame data of the data set that is selected based on the class of the selected material data and the time information. In F1109, the storage unit 109 outputs the designated data to the transmission/reception unit 110, and in F1110, the transmission/reception unit 110 transmits the material data to the device 112 from which the transmission start request is received. In F1111, the device 112 receives the material data, generates (renders) a virtual viewpoint image using the material data, and displays the generated virtual viewpoint image. Thereafter, the information processing apparatus 100 transmits material data in frame order until a transmission end request is received from the device 112.

In F1112, in a case where the virtual viewpoint image generation is ended, the device 112 transmits a transmission end request for material data to the information processing apparatus 100. In F1113, in a case where the transmission/reception unit 110 receives the transmission end request, the transmission/reception unit 110 transmits a notification to the processing units of the information processing apparatus 100. Then, the processing is ended. The foregoing processing is performed independently on each of the plurality of devices 112.

With the foregoing configurations and operations, the information processing apparatus 100 outputs, to each of the devices 112, material data selected from among the plurality of material data including different material data, based on information for identifying a format of material data processable by the device 112. This enables each of the devices 112 to generate and display a virtual viewpoint image appropriately even in a case where the plurality of devices 112 is connected.

(Modified Example of First Exemplary Embodiment)

According to the first exemplary embodiment, for example, the second model generation unit 105 generates colored point clouds using the point cloud data and the foreground image data generated by the first model generation unit 104. In the above-described example according to the first exemplary embodiment, the first model generation unit 104, the second model generation unit 105, the distance image generation unit 106, and the mesh model generation unit 107 generate material data using data generated by the first model generation unit 104, the second model generation unit 105, the distance image generation unit 106, and the mesh model generation unit 107. This is not a limiting example. For example, according to the first exemplary embodiment, the first model generation unit 104, the second model generation unit 105, the distance image generation unit 106, and the mesh model generation unit 107 can each acquire the captured images from the accumulation unit 103 and generate material data independently of each other. In this case, steps S803 to S812 in FIG. 8 are performed by the processing units in parallel.

While, in the first exemplary embodiment, the foreground images are divided on an object basis and the divided foreground images are stored, the configuration is not limited to that described above, and original images captured by the cameras can be stored. Further, while, in the first exemplary embodiment, the point cloud data is stored on a frame-by-frame basis, the configuration is not limited to that described above. For example, each object can be identified, and the point cloud data can be stored on an object-by-object basis.

While, in the first exemplary embodiment, information for identifying three-dimensional shape data is stored in the header of the sequence to identify the data, the configuration is not limited to that described above, and the information can be managed using a list associated with the data by the storage unit 109 and/or the management unit 108. Further, the management unit 108 can encode the point cloud data, the foreground images, the colored point cloud data, the distance image data, and the mesh data generated by the first model generation unit 104, the second model generation unit 105, the distance image generation unit 106, and the mesh model generation unit 107.

While, in the first exemplary embodiment, the time information is used as information indicating time, the configuration is not limited to that described above, and a frame ID or information for identifying a frame can be used. Further, according to the first exemplary embodiment, a data set generation method can be provided as data set meta-information, and in a case where there are data sets that are the same in class but are generated by a different method from each other, the information can be transmitted to a device, and the device can select a data set. Furthermore, in addition to the present exemplary embodiment, 360-degree images or normal two-dimensional images can be generated, and the generated images can be stored as a data set.

Figure 12:
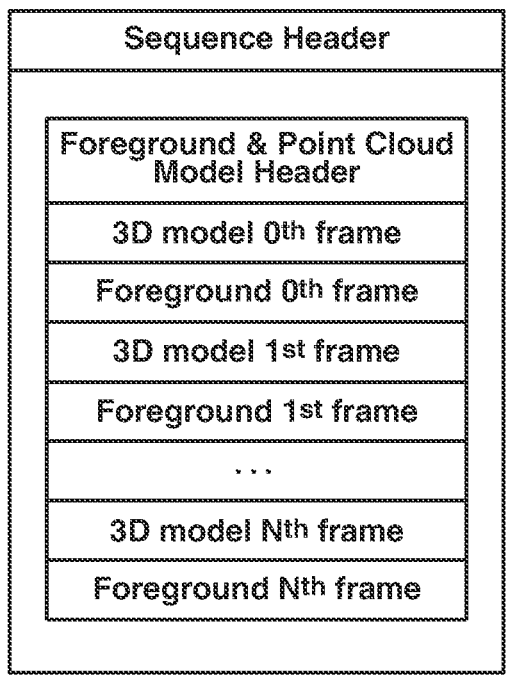
FIG. 12 is a diagram illustrating an example of a data structure of material data stored in the storage unit.

As illustrated in in FIG. 12, frame data of the point cloud data and frame data of the foreground image data can be simply interleaved and transmitted alternately. Similarly, the distance image data can be used instead of the point cloud data.

Figure 13:
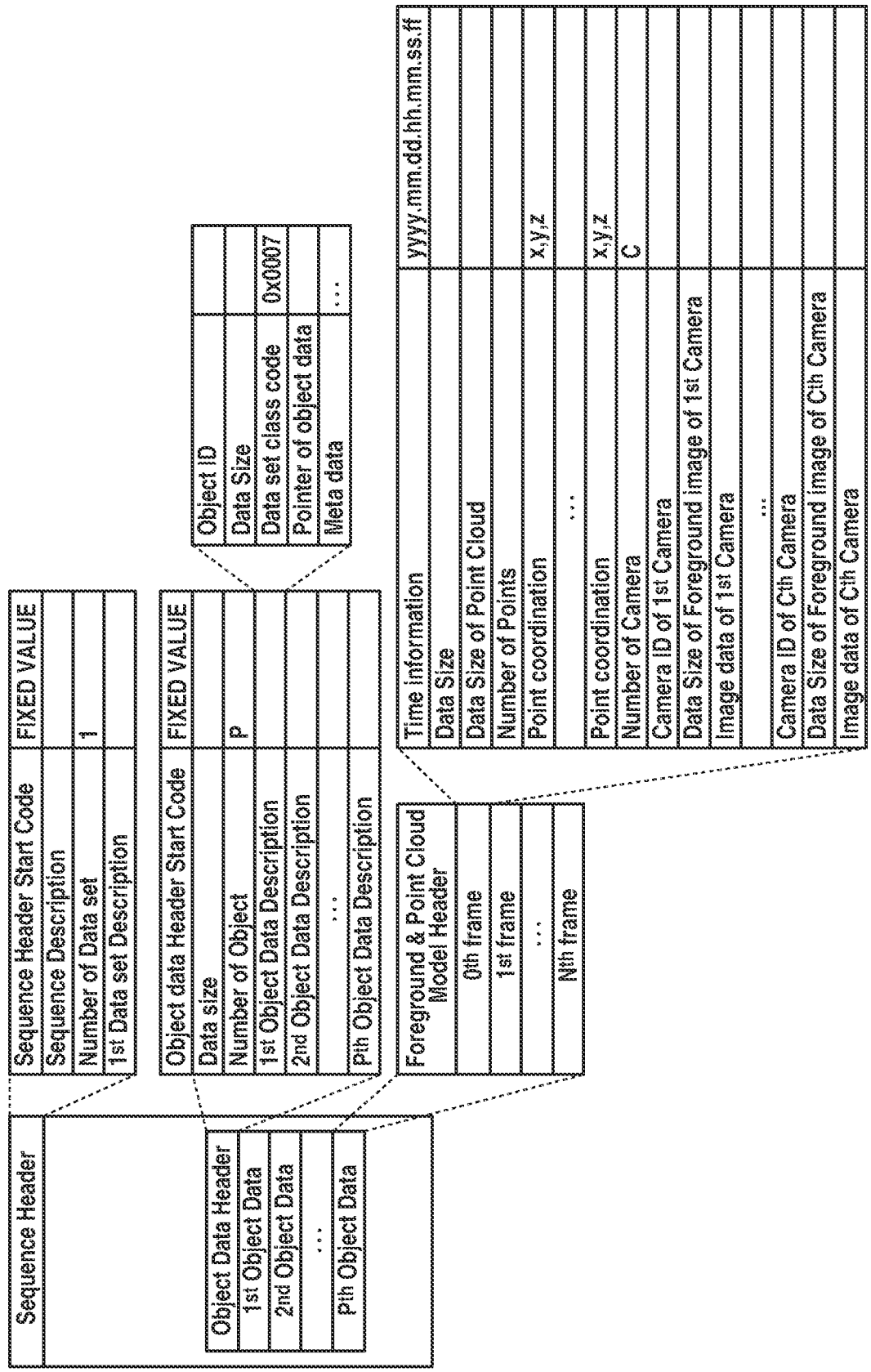
FIG. 13 is a diagram illustrating an example of a data structure of material data stored in the storage unit.

Further, the material data can be managed on an object-by-object basis. FIG. 13 illustrates an example thereof.

An object data set is defined as a new data set of a sequence. There may be a plurality of object data sets. For example, object data sets can be provided on a predetermined unit, such as by the team to which the objects belong.

An object data header at the beginning of the object data set stores an object data header start code (Object Data Header) indicating the beginning of the object data set. Furthermore, the object data header stores a data size (Data size). Next, the number of objects (Number of Object) P included in the object data set is stored. Next, data information is recorded and stored on an object-by-object basis.

The object data information (Pth Object Data Description) stores an object ID number (Object ID) and a size of the object data information (Data Size). Next, a data set class code (Data set class code) indicating the class of the data as the data set is stored. Further, a pointer of object data on the object (Pointer of object data) is stored. Further, metadata about the object (Meta data) is stored. The metadata can store, for example, information about names, teams, and uniform numbers of players in sports.

The object data stores data based on the data set class code. FIG. 13 illustrates an example of a data set of a combination of the foreground image and the point cloud data. A size of the object data set, time information about the first frame, and a frame rate are stored as a header at the beginning. Next, data is stored by a frame-by-frame basis. At the beginning of the data of each frame, time information (Time information) about the frame and a data size of the frame (Data size) are stored. Next, a size of the point cloud data of the object in the frame (Data Size of Point Cloud) and the number of points (Number of Points) are stored. Next, coordinates of the points of the point clouds (Point coordination) are stored. Next, the number of cameras (Number of Camera) C by which an object is captured is stored. Next, camera IDs of the cameras (Camera ID of 1st Camera) and foreground image data (Data Size of Foreground image of 1st Camera) are stored. The camera IDs and the foreground image data are stored on a camera-by-camera basis.

In a case where the object data set is colored point cloud data, a data set class code is set, and time information, a data size, the number of points of the colored point cloud, and the colored point cloud data are stored as data on the frames, as illustrated in FIG. 14A. Further, in a case where the object data set is mesh data, a data set class code is set, and time information, a data size, the number of polygons, and data on each polygon are stored as data on the frames, as illustrated in FIG. 14B. Further, in a case where the object data set is distance images, a data set class code is set, and time information, a data size, the number of cameras, and data on each distance image are stored as data on the frames, as illustrated in FIG. 14C.

As described above, the data is managed on an object-by-object basis and output, which results in reduction in, for example, the time from the designation of an object, such as a player or a performer, to the reading of images focused on the designated object. This is effective in generating an image focused on movements of a designated player or a virtual viewpoint image tracking the back of an object. Further, a designated player can be searched easily.

Further, the management unit 108 can generate a sequence for each class of material data, as illustrated in FIG. 15. In this case, the selection unit 111 selects a sequence corresponding to a class of material data to be output to a device. With this configuration, the sequences can be output together in accordance with a rendering method that the output destination device uses, so that prompt output is realized.

Figure 9:
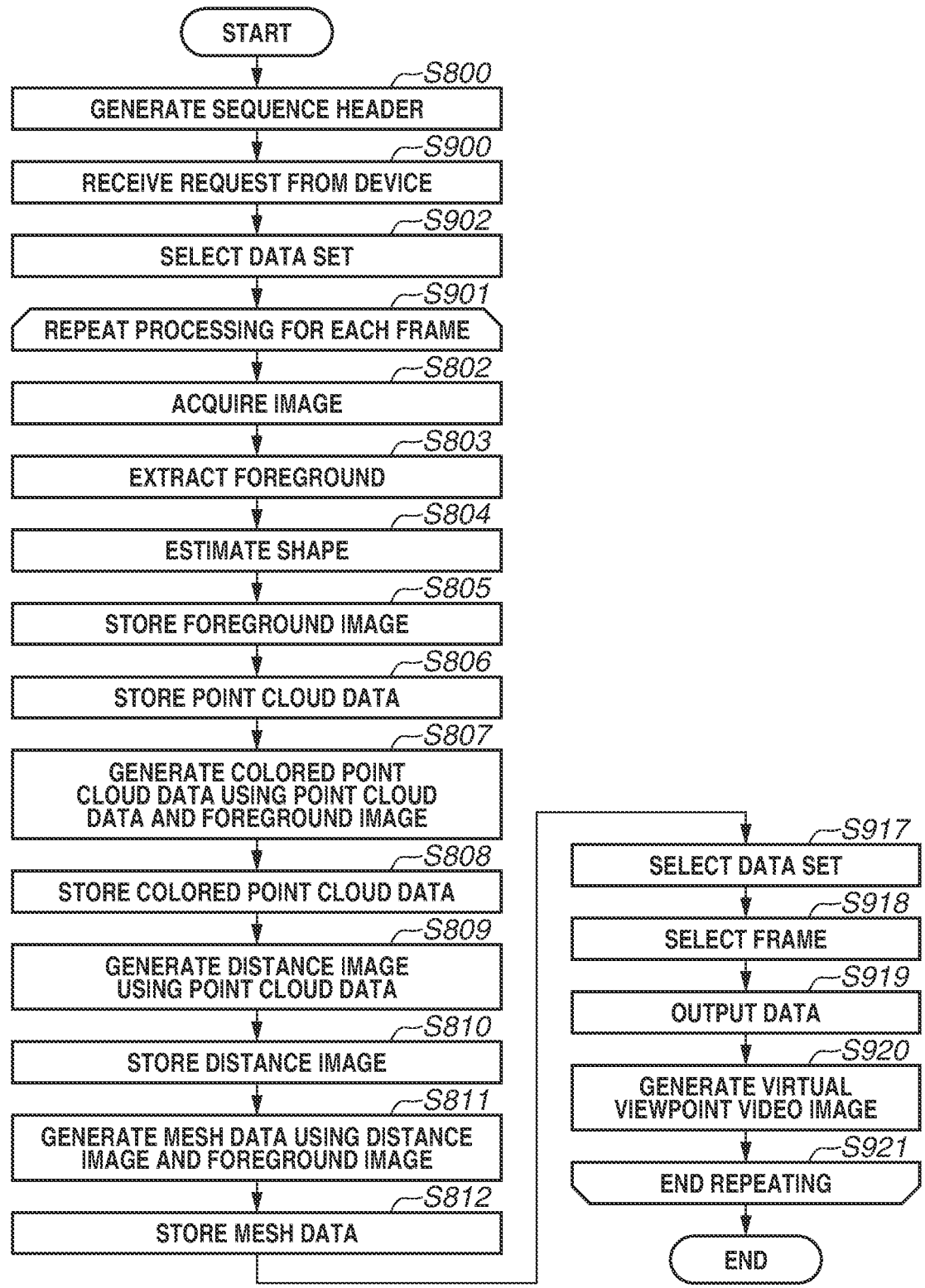
FIG. 9 is a flowchart illustrating an example of a process that is performed by the virtual viewpoint image generation system according to the first exemplary embodiment.

Further, while, in the first exemplary embodiment, the devices generate a virtual viewpoint image after the generation of a plurality of material data, the configuration is not limited to that described above. By performing operations illustrated in FIG. 9, the devices 112 can generate a virtual viewpoint image while material data is being generated. In FIG. 9, each step corresponding to an operation of a processing unit in FIG. 8 is given the same reference numeral, and redundant descriptions thereof are omitted.

In step S900, as in step S814 in FIG. 8, the transmission/reception unit 110 acquires information for identifying a format of material data processable by the device 112 that is to display a virtual viewpoint image. Furthermore, the transmission/reception unit 110 acquires information, such as time information about a virtual viewpoint image to be generated by the device 112. In step S901, the virtual viewpoint image generation system 1 repeats steps S802 to S920 on each frame of a virtual viewpoint image to be generated.

In step S901, the selection unit 111 outputs information about sequence data selected based on the information, such as the time information, to the management unit 108. The management unit 108 selects sequence data indicated by the acquired information. In steps S801 to S812, acquisition of the captured images of the frames, generation of material data, and storage of the generated material data are performed, as in FIG. 8. In step S917, the management unit 108 selects a data set of material data to be transmitted to the device 112, based on the class of the data set selected in step S902. In step S918, the transmission/reception unit 110 selects frame data of the selected data set from the generated material data. In step S919, the selected frame data is output to the device 112.

In step S920, the device 112 generates a virtual viewpoint image based on the received material data and the virtual viewpoint set based on a user operation and displays the generated virtual viewpoint image.

In step S921, the virtual viewpoint image generation system 1 performs determination of whether to end the repeat processing. For example, in a case where the information processing apparatus 100 receives a notification to end the virtual viewpoint image generation from the device 112, the repeat processing is ended. By the foregoing operations, a virtual viewpoint image is generated by the device 112 while material data is being generated. With this configuration, it is possible to, for example, view a virtual viewpoint image with reduced delay while the cameras 101 are imaging. Even in a case where the device 112 ends the virtual viewpoint image generation in step S921, steps S802 to S812 of generating material data and storing the material data can be continued.

Figure 11:
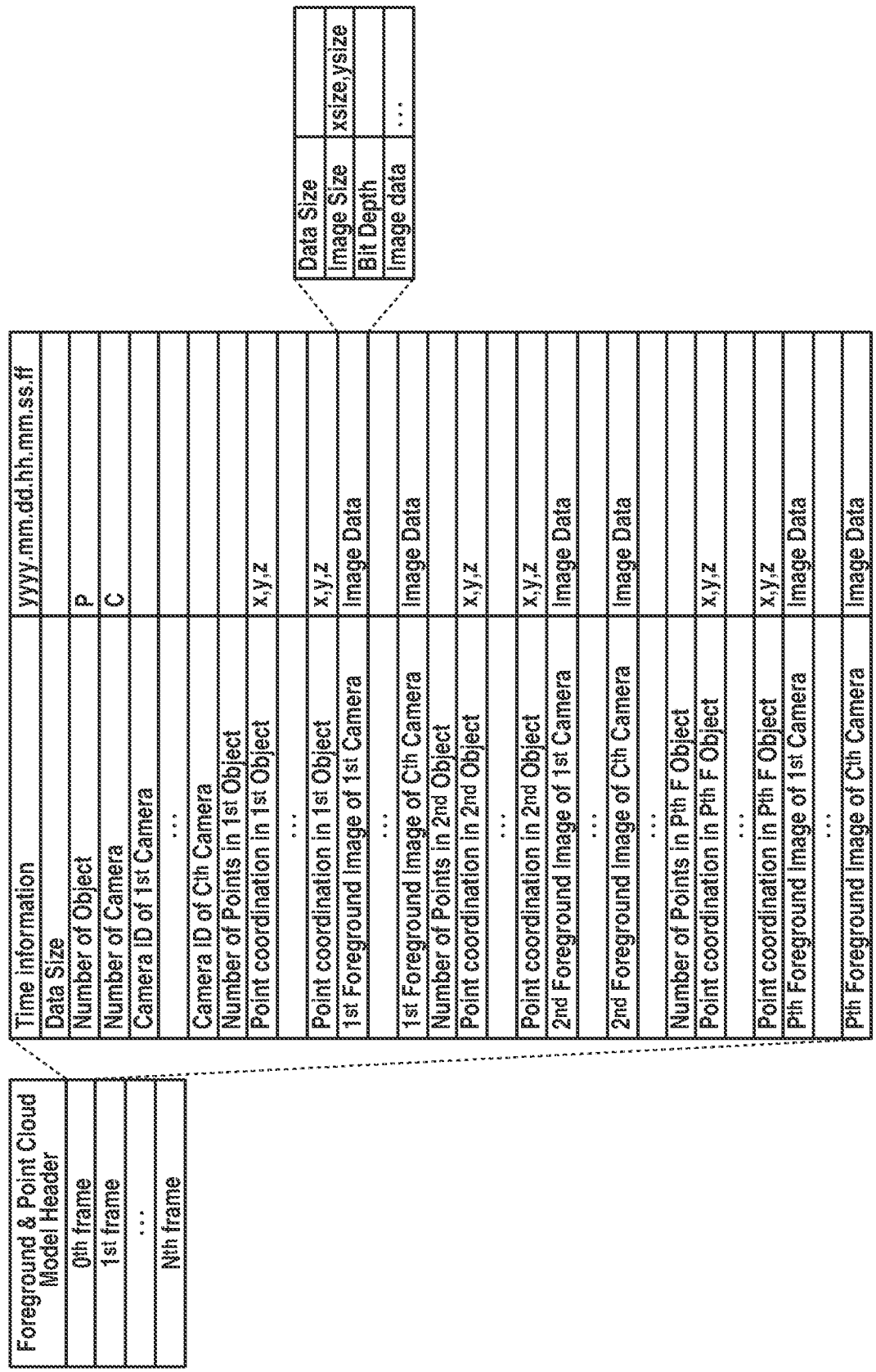
FIG. 11 is a diagram illustrating an example of a data structure of material data stored in the storage unit.

Further, while, in the first exemplary embodiment, the foreground image data and the point cloud data are stored as different data sets, the configuration is not limited to that described above. FIG. 1I illustrates an example of a foreground image/point cloud data set generated by combining the foreground image data and the point cloud data together. A format illustrated in FIG. 11 stores a foreground image/point cloud data header (Foreground & Point Cloud Model Header) at the beginning of the data set as in the foreground image data set in FIG. 3. The data header stores information indicating that the data set is a foreground image/point cloud data set and information about the number of frames. Next, the foreground image data and the point cloud data of the frame are stored. The foreground image/point cloud data of each frame stores time information (Time information) indicating the time of the frame and a data size (Data Size) of the frame. Next, the number of objects (Number of Object) P corresponding to the time indicated by the time information is stored. Furthermore, the number of cameras (Number of Camera) C used in imaging at the time is stored. Next, the camera IDs of the cameras used (Camera ID of 1 st to Cth Camera) are stored. Next, data on each object is stored. First, the number of coordinate points forming the point cloud of the object is stored as in the point cloud data in FIG. 4. Next, coordinates of the points are stored. Next, the foreground image data of cameras having captured the object is sequentially stored as in FIG. 3. The point cloud data and the foreground image data are stored on an object-by-object basis.

With the foregoing configuration, a necessary combination of data sets can be combined together for the device that is a renderer and the combined data sets can be stored. This simplifies the data reading. While the format of the combination of the point cloud data and the foreground image data is described above, this is not a limiting format. For example, a format formed by combining any data can be used, such as a format of a combination of the distance images and the foreground images or a format of a combination of three or more material data.

Figure 16:
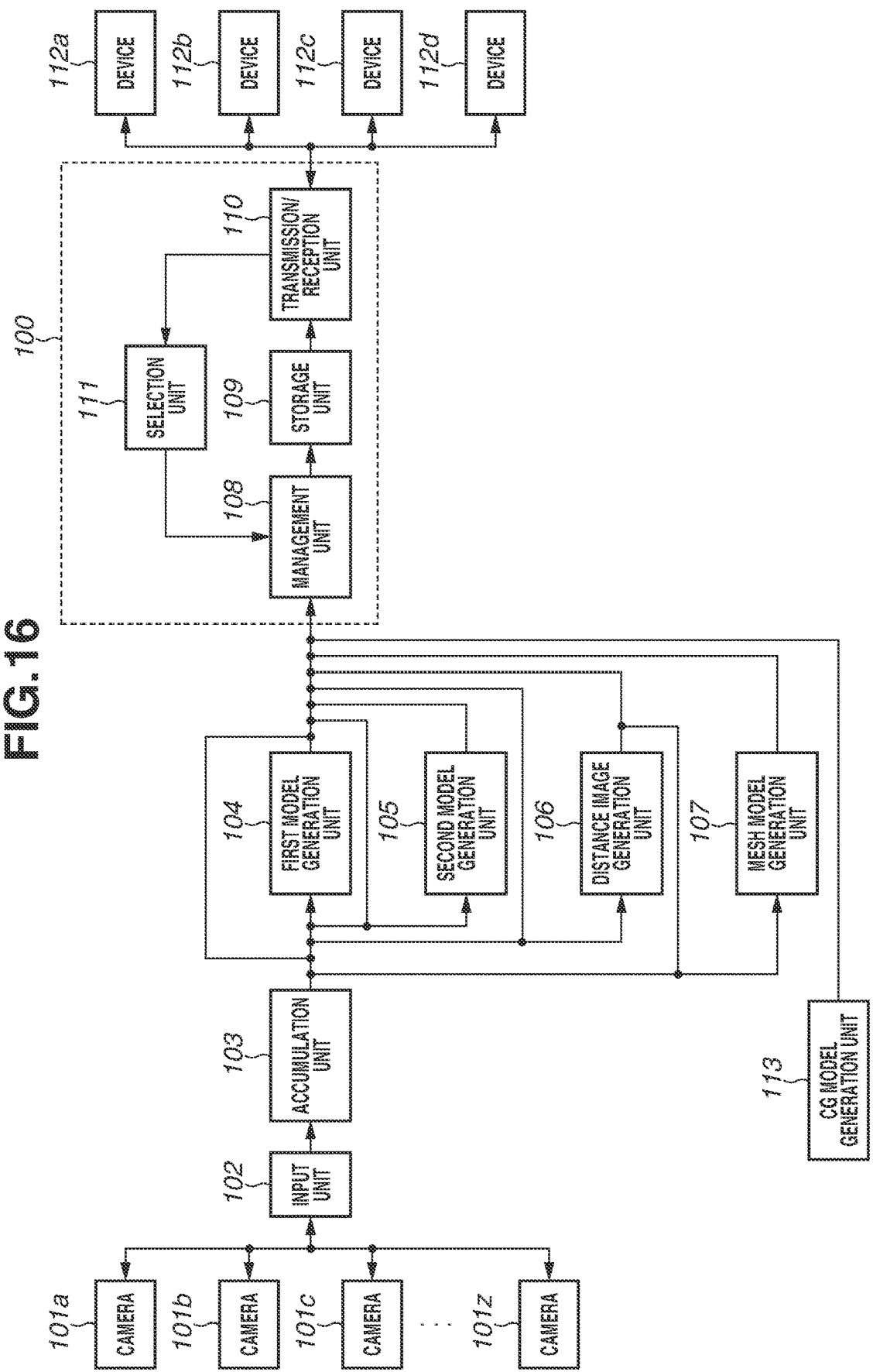
FIG. 16 is a diagram illustrating an example of a configuration of a virtual viewpoint image generation system including the information processing apparatus according to the first exemplary embodiment.

Further, a computer graphics (CG) model generation unit 113 illustrated in FIG. 16 can be added to the configuration of the virtual viewpoint image generation system 1 according to the first exemplary embodiment. The CG model generation unit 113 generates, as material data, three-dimensional shape data of a plurality of classes using computer-aided design (CAD) or CG software. The management unit 108 can acquire the material data generated by the CG model generation unit 113 and can store the acquired material data, like the other material data, in the storage unit 109.

Figure 17:
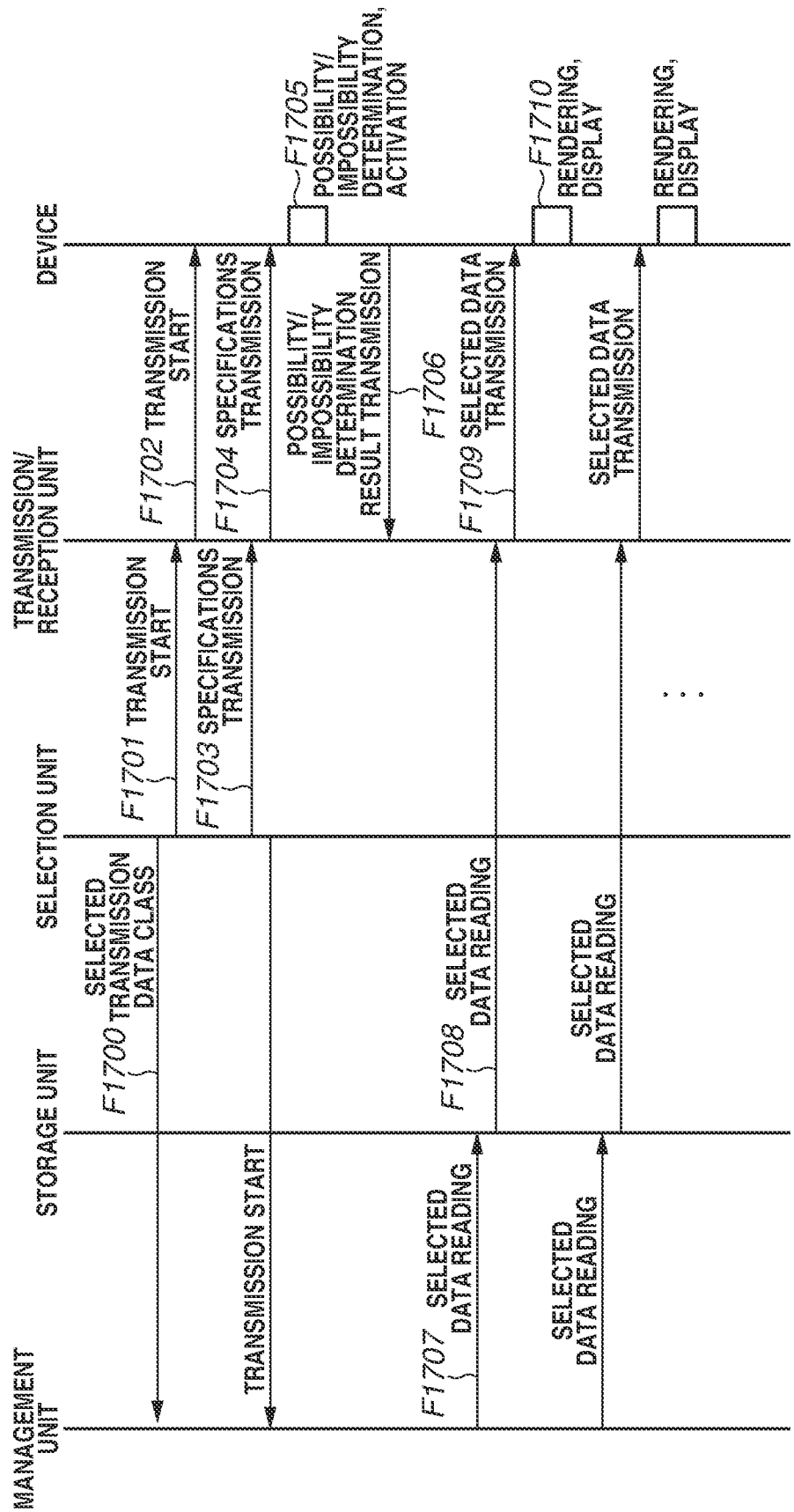
FIG. 17 is a diagram illustrating an example of communication that is performed by the virtual viewpoint image generation system.

Further, FIG. 17 illustrates another example of a flow of communication that the virtual viewpoint image generation system 1 performs. Transmission of material data from the information processing apparatus 100 serves as a trigger for starting a process illustrated in FIG. 17. First, in F1700, the selection unit 111 selects a class of a data set to be transmitted and time information about the beginning of the data to be transmitted and transmits the selected class and the selected time information to the management unit 108. The management unit 108 transmits, to the storage unit 109, designation of reading frame data of the data set that is selected based on the class of the selected data set and the time information. In F1701, the selection unit 111 transmits, to the transmission/reception unit 110, information indicating that data transmission is to be started. In F1702, the transmission/reception unit 110 transmits, to the devices 112, information indicating that data transmission is to be started. Having received the information, the devices 112 prepare for data reception.

In F1703, the selection unit 111 transmits, to the transmission/reception unit 110, the class of the material data and the time information about the beginning as specifications of the data set to be transmitted. In F1704, the transmission/reception unit 110 transmits the received information to the devices 112. In F1705, each of the devices 112 performs determination of whether it is possible for the device 112 to generate a virtual viewpoint image using the data set of the class that is transmitted from the information processing apparatus 100, and in a case where it is possible, the device 112 prepares for virtual viewpoint image generation. Further, in F1706, the device 112 transmits the possibility/impossibility determination result to the information processing apparatus 10. In a case where the result of the possibility/impossibility determination by the device 112 is "possible", the selection unit 111 transmits data transmission start to the management unit 108. On the other hand, in a case where the possibility/impossibility determination result is "impossible", the information processing apparatus 100 transmits specifications of another data set to the devices 112 and waits again for possibility/impossibility determination results. Alternatively, in F1703, the selection unit 111 can refer to the classes of material data stored in the storage unit 100 and transmit specifications of a data set that can be transmitted. In this case, in F1705, the device 112 notifies the information processing apparatus 100 of information for identifying a class of material processable by the device 112.

In F1707, the management unit 108 having received the transmission start transmits, to the storage unit 109, designation of reading frame data of the data set that is selected based on the class of the selected material data and the time information about the first frame. In F1708, the storage unit 109 outputs the designated data to the transmission/reception unit 110, and in F1709, the transmission/reception unit 110 transmits the data to the device 112 determined as being capable to receive. In F1710, the device 112 receives the data, renders the data, generates a virtual viewpoint image, and displays the generated virtual viewpoint image. Thereafter, the device 112 receives frame data from the data set selected in frame order and generates a virtual viewpoint image until the virtual viewpoint image generation is ended.

By performing the foregoing communication, material data can be selected at the transmission side. The data transmission can be performed unilaterally without transmission of possibility/impossibility results. Further, in selecting material data, the information processing apparatus 100 can refer to, for example, information about previously-communicated devices and a table in which device information and the classes of material data are associated.

While, according to the first exemplary embodiment, the point cloud data, the foreground images, the colored point cloud data, the distance images, and the mesh data are generated as the plurality of material data in the above-described example, data other than the foregoing material data can also be generated. A case where billboard data is to be generated will be described below as an example.

The billboard data is data obtained by coloring a plate-shaped polygon using the foreground images. The billboard data herein is generated by the mesh model generation unit 107. FIGS. 22A and 22B illustrate an example of a configuration of billboard data stored in the storage unit 109. For description, the billboard data set is stored on a frame-by-frame basis, but the configurations is not limited to that described above. At the beginning of the data set, a billboard data header is stored as illustrated in FIG. 22A. The header stores information indicating that the data set is a billboard data set and information about the number of frames. The billboard data of each frame stores time information (Time Information) indicating the time of the frame. Next, a data size (Data Size) of the frame is stored. Next, the billboard data of the cameras is stored on an object-by-object basis.

The billboard data is stored as a combination of polygon data of billboards of the cameras and image data for texture mapping on an object-by object basis. First, a single piece of polygon data (Polygon billboard of Cth Camera for Pth Object) of the billboards is described. Next, the foreground image data (Foreground Image of Cth Camera for Pth Object) for texture mapping is stored. The billboard method uses an object as a single polygon to reduce processing and data amounts greatly. The number of polygons representing the billboard data is not limited to one and is less than the number of polygons of the mesh data. With this configuration, it is possible to generate billboard data with less processing and data amounts than those of the mesh data.

As described above, the virtual viewpoint image generation system 1 according to the present exemplary embodiment is capable of generating various types of material data and outputting the generated material data to the devices. Not all the above-described material data are necessarily to be generated, and any material data can be generated. Further, instead of generating the plurality of material data in advance, the virtual viewpoint image generation system 1 capable of generating the plurality of material data can identify material data to be generated, based on the device information. For example, the selection unit 111 of the information processing apparatus 100 selects a class of material data to be output to the device 112, based on the information for identifying a class of a virtual viewpoint image that the device 112 is able to display. The selection unit 111 notifies the class of the selected material data to the management unit 108, and the management unit 108 transmits an instruction to generate the material data to a processing unit that generates the selected material data. For example, in a case where the selected material data is the colored point cloud data, the management unit 108 instructs the second model generation unit 105 to generate colored point cloud data.

Furthermore, the management unit 108 can read the input image data from the accumulation unit 103 via signal lines (not illustrated) and generate the selected material data. The read image data is input to the corresponding one of the first model generation unit 104, the second model generation unit 105, the distance image generation unit 106, and the mesh model generation unit 107, and material data to be used is generated. The generated material data is output to the device 112 via the management unit 108, the storage unit 109, and the transmission/reception unit 110.

While, according to the first exemplary embodiment, information that does not change, such as the classes of the devices, is mainly described above as the information for identifying a format of material data processable by the device 112, the configuration is not limited to those described above. Specifically, the information for identifying a format of material data processable by the device 112 can be information that changes dynamically. For example, in a case where there is a change in material data processable by the device 112 due to an increase in the processing load, the device 112 transmits information again to the information processing apparatus 100. This enables the information processing apparatus 100 to select suitable material data to be output to the device 112. Furthermore, the information processing apparatus 100 can select material data to be output dynamically based on a change in communication bandwidths of communication paths to the device 112.

While, according to the first exemplary embodiment, the generated material data is stored in the same storage unit 109, the configuration is not limited to that described above. Specifically, material data can be stored in different storage units according to class. In this case, the information processing apparatus 100 can include a plurality of storage units, or storage units can be included as a different apparatus from each other in the virtual viewpoint image generation system 1. In a case where a plurality of types of material data is to be stored in different storage units, the information processing apparatus 100 outputs, to the device 112, information about a pointer indicating a storage location of material data to be output to the device 112. This enables the device 112 to access the storage unit storing material data to be used for virtual viewpoint image generation and acquire the material data.

Second Exemplary Embodiment

A configuration of a system in which the device 112 generates a virtual viewpoint image according to the first exemplary embodiment is described above. A configuration of an information processing apparatus that generates a virtual viewpoint image according to the present exemplary embodiment will be described below. A hardware configuration of an information processing apparatus 200 according to the present exemplary embodiment is similar to that according to the first exemplary embodiment, so that the redundant descriptions are omitted. Further, each functional configuration corresponding to a functional configuration according to the first exemplary embodiment is given the same reference number as the corresponding functional configuration, and the redundant descriptions are omitted.

Figure 18:
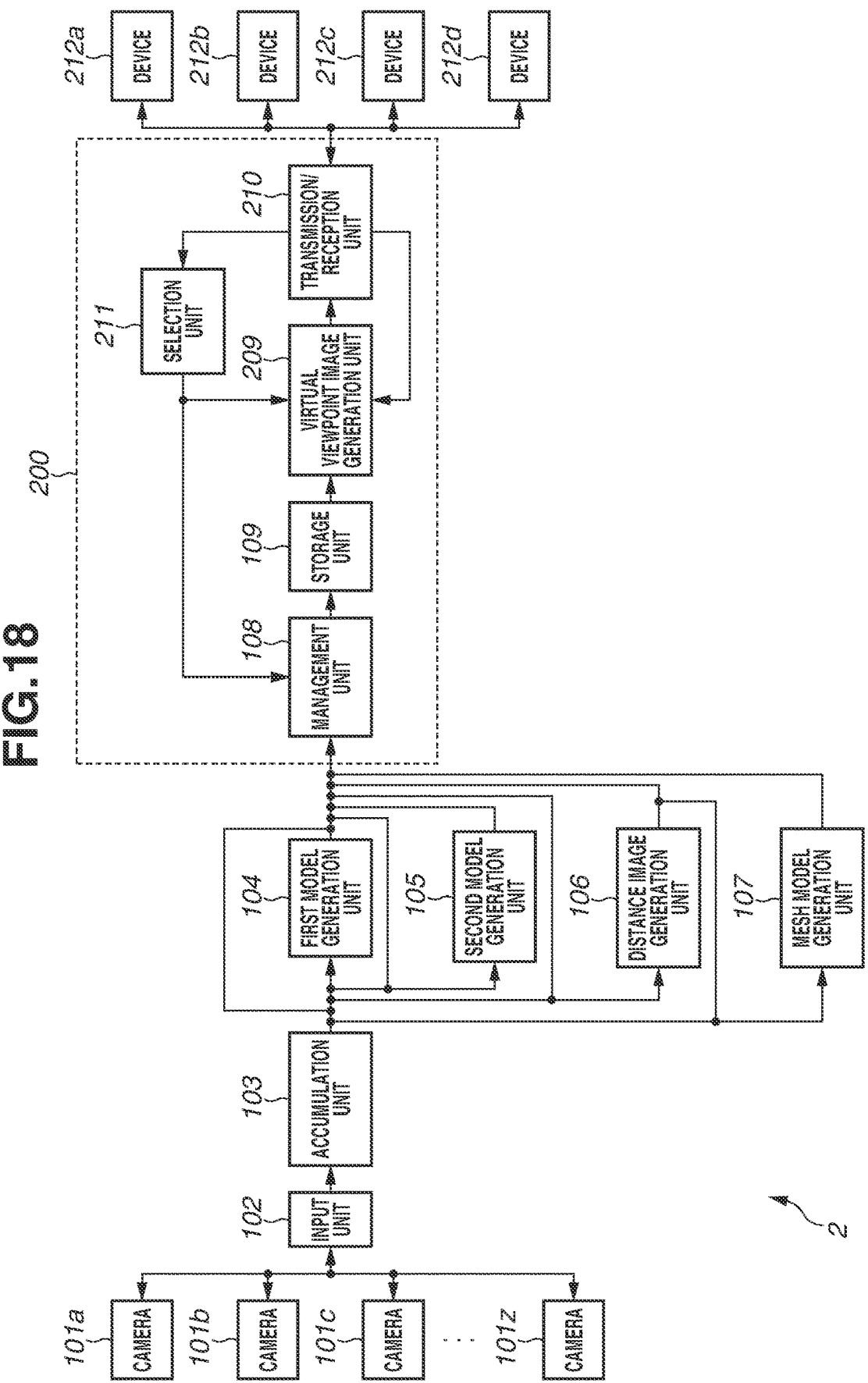
FIG. 18 is a diagram illustrating an example of a configuration of a virtual viewpoint image generation system including an information processing apparatus according to a second exemplary embodiment.

FIG. 18 is a diagram illustrating a configuration of a virtual viewpoint image generation system 2 including the information processing apparatus 200. The information processing apparatus 200 includes a virtual viewpoint image generation unit 209, a transmission/reception unit 210, and a selection unit 211, in addition to a configuration similar to the configuration of the information processing apparatus 100 according to the first exemplary embodiment. Devices 212a to 212d each set a virtual viewpoint based on a user operation and transmit virtual viewpoint information indicating the set virtual viewpoint to the information processing apparatus 200. The devices 212a to 212d do not include a function (renderer) of generating a virtual viewpoint image and only set a virtual viewpoint and display a virtual viewpoint image. Hereinafter, unless the devices 212a to 212d need to be discriminated from each other, the devices 212a to 212d will be referred to simply as "device(s) 212".

The transmission/reception unit 210 receives the virtual viewpoint information from the device 212 and transmits the received virtual viewpoint information to the virtual viewpoint image generation unit 209. The transmission/reception unit 210 further includes a function of transmitting a generated virtual viewpoint image to the device 212 that is the transmitter of the virtual viewpoint information. The virtual viewpoint image generation unit 209 includes a plurality of renderers and generates a virtual viewpoint image, based on the input virtual viewpoint information. The plurality of renderers generates virtual viewpoint images each based on different material data. The virtual viewpoint image generation unit 209 is capable of operating the plurality of renderers simultaneously and generating a plurality of virtual viewpoint images based on requests from the plurality of devices 212.

The selection unit 211 selects a data set to be used by the virtual viewpoint image generation unit 209 to generate a virtual viewpoint image. The selection is performed based on a processing load and a data reading load. For example, there may be a case where an image generation request is received from the device 212b while an image is being generated using the foreground image data set and the point cloud data set based on a request from the device 212a. In the present exemplary embodiment, the foreground image data and the point cloud data are greater in data amount than other material data. In a case where the selection unit 211 determines that a bandwidth for reading from the storage unit 109 is insufficient for reading the two sets of data set, i.e., the foreground image data set and the point cloud data set, the selection unit 211 selects the mesh data set, which is smaller in data amount than the foreground image data and the point cloud data. The virtual viewpoint image generation unit 209 sets a renderer for the mesh data and generates a virtual viewpoint image for the device 212b using the mesh data. The data amount is still reduced even in a case where the colored point cloud data set, which is smaller in data amount than the foreground image data and the point cloud data, is selected instead of the mesh data.

Further, a request from the device 212 may lead to excess of the processing capability of the virtual viewpoint image generation unit 209 or a reduction in power consumption. The selection unit 211 selects another data set requiring a low processing load to use a renderer with lighter processing load. For example, the processing using the foreground image data set and the point cloud data set is higher in processing load than the processing using the colored point cloud data set. In a case where the number of devices exceeds limitation of the capability of generating a virtual viewpoint image using the foreground image data set and the point cloud data set, the virtual viewpoint image generation using the colored point cloud data set is performed. As described above, the information processing apparatus 200 according to the present exemplary embodiment selects material data for use in virtual viewpoint image generation, based on the processing loads.

Figure 19:
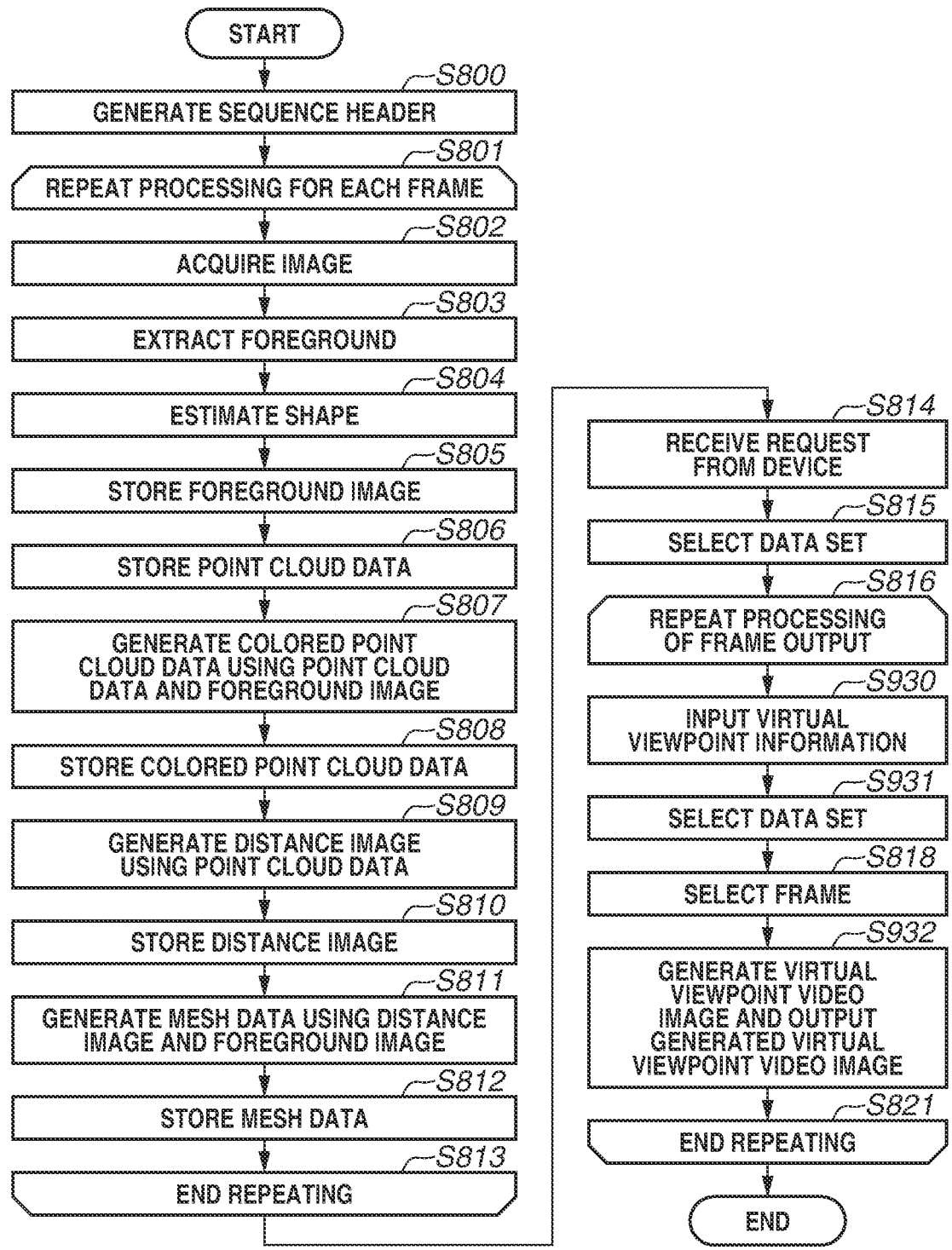
FIG. 19 is a flowchart illustrating an example of a process that is performed by the virtual viewpoint image generation system according to the second exemplary embodiment.

Operations of the virtual viewpoint image generation system 2 will be described below with reference to a flowchart in FIG. 19. In FIG. 19, steps corresponding to the operation of each unit in FIG. 8 is given the same reference numerals, and the redundant descriptions are omitted. In step S930, the transmission/reception unit 210 acquires the virtual viewpoint information from the device 212 and transmits the acquired virtual viewpoint information to the selection unit 211 and the virtual viewpoint image generation unit 209. In step S931, the selection unit 211 selects a virtual viewpoint image generation method (renderer) for the virtual viewpoint image generation unit 209, based on the loads on the virtual viewpoint image generation unit 209 and the transmission bandwidth, and transmits information to the management unit 108 so that the management unit 108 selects necessary material data.

In step S932, a virtual viewpoint image is generated using the selected virtual viewpoint image generation method, and the generated virtual viewpoint image is output to the device 212 via the transmission/reception unit 210. With the foregoing configuration and operations, the processing loads on a three-dimensional information processing apparatus are adjusted based on an increase or a decrease of the devices to make it possible to transmit a virtual viewpoint image to a greater number of devices.

While, the present exemplary embodiment, virtual viewpoint image generation is performed using different material data in accordance with the processing loads on the information processing apparatus 200 and the transmission bandwidth, the configuration is not limited to that described above. The information processing apparatus 200 can select a virtual viewpoint image to be generated based on, for example, a virtual viewpoint image format processable for reproduction by the device 212, software or an application for use in reproduction, and display capabilities of a display unit of the device 212.

Further, in a case where the processing capabilities of the virtual viewpoint image generation unit 209 are exceeded, the number of information processing apparatuses 200 can be increased based on a class of a data set requested by the device 212.

Third Exemplary Embodiment

An information processing apparatus that converts generated material data into different material data and uses the converted material data according to the present exemplary embodiment will be described below. A hardware configuration of an information processing apparatus 300 according to the present exemplary embodiment is similar to those according to the above-described exemplary embodiments, and the redundant descriptions are omitted. Further, functional configurations corresponding to the functional configurations according to the above-described exemplary embodiments is given the same reference number as the corresponding functional configuration, and the redundant descriptions are omitted.

Figure 20:
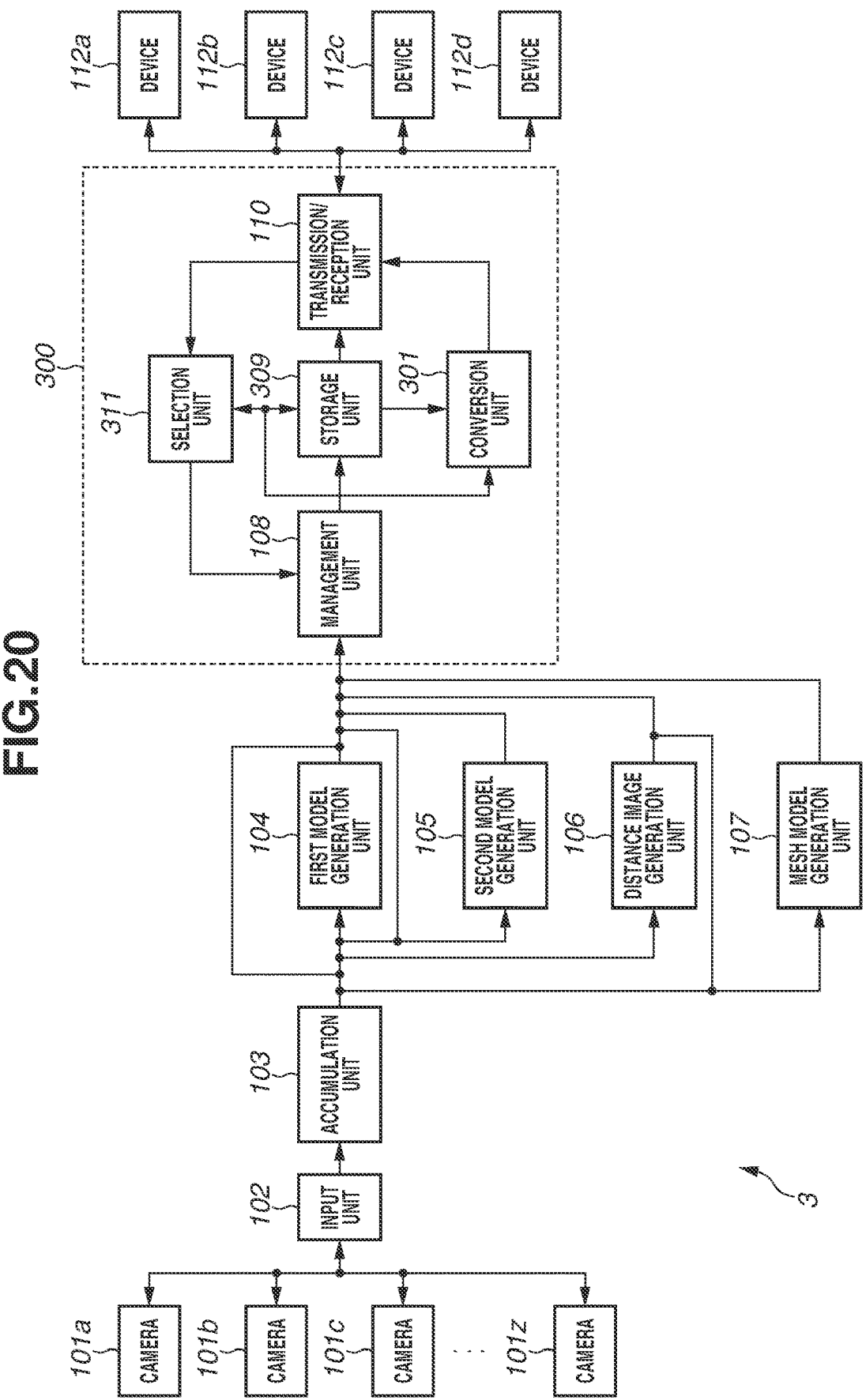
FIG. 20 is a diagram illustrating an example of a configuration of a virtual viewpoint image generation system including an information processing apparatus according to a third exemplary embodiment.

A configuration of a virtual viewpoint image generation system 3 including the information processing apparatus 300 will be described below with reference to FIG. 20. A conversion unit 301 is a conversion unit that converts a data set into a different data set. A selection unit 311 has a function of controlling a data set to be converted using the conversion unit 301 in a case where a data set that is not stored in the storage unit 109 is input from the device 112, in addition to the functions of the selection unit 111 according to the first exemplary embodiment. A storage unit 309 has a function of outputting a class of a stored data set to the selection unit 311 and a function of outputting stored data to the conversion unit 301.

An example of processing that the information processing apparatus 300 performs will be described below. For example, there may be a case where a distance image output request is received from the device 112 when only the foreground image data set and the point cloud data set are stored in the storage unit 109. In this case, the selection unit 311 compares the data set request from the device 112 that is input from the transmission/reception unit 110 and the content of the storage unit 309. As a result of the comparison, it is determined that no matching data sets are stored. Furthermore, in order to read a data set to be converted by the conversion unit 301, the selection unit 311 instructs the management unit 108 to read a necessary data set. The conversion unit 301 acquires the point cloud data set from the storage unit 309, generates distance image data by calculating distances from the points of the point cloud data to the respective cameras 101, and converting the point cloud data set into a distance image data set. Specifically, the point cloud data set illustrated in FIG. 4 is converted into the distance image data set illustrated in FIG. 6. The transmission/reception unit 110 outputs the distance image data obtained by the conversion to the device 112.

Further, in another example of conversion processing, the conversion unit 301 performs conversion into another data set by re-arranging data in a data set. For example, there may be a case where the device 112 requests data formats arranged for each object when only the foreground image data set and the point cloud data set are stored in the storage unit 109. The selection unit 311 compares the data set request from the device 112 that is input from the transmission/reception unit 110 and the content of the storage unit 309. As a result of the comparison, the selection unit 311 instructs the management unit 108 to read a necessary data set. The management unit 108 reads the foreground image data and the point cloud data set from the storage unit 309 based on the instruction from the selection unit 311 and transmits the foreground image data and the point cloud data set to the conversion unit 301. The conversion unit 301 generates an object data set by re-arranging the data and generating header data and outputs the generated object data set to the device 112 via the transmission/reception unit 110.

Examples of conversion processing that the conversion unit 301 performs have been described above. The conversion processing is not limited to the above-described examples, and it is also possible to, for example, change the point cloud data into the mesh data, combine or separate a plurality of material data, or convert data into other data.

Next, operations of the virtual viewpoint image generation system 3 will be described below with reference to a flowchart in FIG. 21. In FIG. 21, steps corresponding to operations of each processing unit according to the above-described exemplary embodiments are given the same reference numerals, and the redundant descriptions are omitted. In step S1001, the selection unit 311 checks whether any of the material data stored in the storage unit 309 matches the request from the device 112. In a case where there are no matching data sets (NO in step S1001), the processing proceeds to step S1002. In a case where there is a matching data set (YES in step S1001), the processing proceeds to step S816.

In step S1002, the selection unit 311 selects a data set stored in the storage unit 309 to use the data set to generate a data set that matches the request from the device 112. The conversion unit 301 acquires the selected data set from the storage unit 309 and converts the acquired data set into a data set that matches the request from the device 112. As described above, the information processing apparatus 300 converts data sets based on requests from devices, whereby it is possible to transmit material data to a wider variety of devices. Further, since material data is generated by converting data on receipt of a request from the device 112, the amount of material data to be stored in advance in the storage unit 309 can be reduced compared to a case where many types of material data are to be stored. This enables effective use of resources of the storage unit 309. It is also possible to store a data set generated by converting data in the storage unit 309. Further, material data generated by conversion and stored in the storage unit 309 can be read from the storage unit 309 and used in subsequent processing.

Other Exemplary Embodiments

While, in the first, second, and third exemplary embodiments, material data is output to a device that is to display a virtual viewpoint image in the above-described examples, output destination apparatuses are not limited to that described above. For example, the above-described exemplary embodiments are also applicable to a case where material data is output to another apparatus that acquires material data and performs predetermined processing on the acquired data. In this case, the information processing apparatus 100 selects material data to be output to the other apparatus, based on information for identifying a format of material data processable by the output destination apparatus.

Configurations of any of the first, second, and third exemplary embodiments can be used in combination. Further, types of material data are not limited to those described above according to the above-described exemplary embodiments, and the above-described exemplary embodiments are also applicable to a configuration that generates a plurality of material data including different material data and generates a virtual viewpoint image.

The present disclosure can be realized also by a process in which a program for realizing one or more functions of the above-described exemplary embodiments is supplied to a system or an apparatus via a network or a storage medium and one or more processors of a computer of the system or the apparatus read the program and execute the read program. Further, the present disclosure can be realized also by a circuit (e.g., application-specific integrated circuit (ASIC)) that realizes one or more functions.

The present invention is not limited to the above-described exemplary embodiments, and various changes and modifications are possible without departing from the spirit and scope of the present invention. Thus, the following claims are attached to disclose the scope of the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to output, to a data output destination apparatus, material data for virtual viewpoint image generation in a format processable by the data output destination apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
one or more memories storing instructions; and
one or more processors executing the instructions to:
acquire a plurality of material data for use in generation of a virtual viewpoint image based on a plurality of images captured with a plurality of imaging apparatuses by imaging an object, the plurality of material data including first material data and second material data different from the first material data; and
output, to another apparatus serving as a material data output destination, material data that is selected based on information for identifying a format of material data from which the other apparatus is able to generate the virtual viewpoint image, from among the acquired plurality of material data.

2. The information processing apparatus according to claim 1, wherein the one or more programs further include instructions to generate the plurality of material data,
wherein the acquiring the generated plurality of material data.

3. The information processing apparatus according to claim 2,
wherein the generating the first material data and the second material data are performed in parallel.

4. The information procedure apparatus according to claim 1, wherein the one or more programs further include instructions to store the acquired plurality of material data,
wherein the outputting, to the other apparatus, material data selected based on the information from among the stored plurality of material data.

5. The information processing apparatus according to claim 4, wherein a sequence representing a predetermined aggregation of the plurality of material data and information for identifying the sequence are stored in association with each other.

6. The information processing apparatus according to claim 1, wherein the information includes class information about the other apparatus.

7. The information processing apparatus according to claim 1, wherein the information includes processing capability information about the other apparatus.

8. The information processing apparatus according to claim 1, wherein the information includes information about a virtual viewpoint image generation method that the other apparatus uses.

9. The information processing apparatus according to claim 1, wherein the information includes information about a virtual viewpoint image format that the other apparatus is able to display.

10. The information processing apparatus according to claim 1, wherein the acquiring the information from the other apparatus,
wherein the outputting, to the other apparatus, material data selected based on the acquired information from among the plurality of material data.

11. The information processing apparatus according to claim 1, wherein the one or more programs further include instructions to hold, for each of a plurality of the other apparatuses that is the material data output destination, information for identifying a format of material data that the plurality of other apparatuses is able to process,
wherein the outputting, to the other apparatus, material data selected based on the held information from among the plurality of material data.

12. The information processing apparatus according to claim 1,
wherein the first material data is data including point cloud data representing a three-dimensional shape of the object and texture data representing a color of the object, and
wherein the second material data is data including point cloud data representing the three-dimensional shape of the object and the color of the object.

13. The information processing apparatus according to claim 1,
wherein the first material data is data including mesh data representing a three-dimensional shape of the object and texture data representing a color of the object, and
wherein the second material data is data including mesh data representing the three-dimensional shape of the object and the color of the object.

14. The information processing apparatus according to claim 1,
wherein the first material data is data including point cloud data representing a three-dimensional shape of the object, and
wherein the second material data is data including mesh data representing the three-dimensional shape of the object.

15. The information processing apparatus according to claim 14, wherein the point cloud data further represents the color of the object.

16. The information processing apparatus according to claim 14, wherein the mesh data further represents the color of the object.

17. The information processing apparatus according to claim 1,
wherein the first material data is data including point cloud data representing a three-dimensional shape of the object, and
wherein the second material data is data including a distance image representing a distance between the plurality of imaging apparatuses and the object and texture data representing a color of the object.

18. The information processing apparatus according to claim 1,
wherein the first material data is data including mesh data representing a three-dimensional shape of the object, and
wherein the second material data is data including a distance image representing a distance between the plurality of imaging apparatuses and the object and texture data representing a color of the object.

19. An information processing apparatus comprising:
one or more memories storing instructions; and
one or more processors executing the instructions to:
acquire material data that is selected based on information for identifying a format of material data from which a virtual viewpoint image is able to be generated, from among a plurality of material data for use in generation of the virtual viewpoint image based on a plurality of images captured with a plurality of imaging apparatuses by imaging an object, the plurality of material data including first material data and second material data different from the first material data; and
generate the virtual viewpoint image, based on the acquired material data.

20. The information processing apparatus according to claim 19, wherein the information includes class information about the information processing apparatus.

21. The information processing apparatus according to claim 19, wherein the information includes processing capability information about the information processing apparatus.

22. The information processing apparatus according to claim 19, wherein the information includes information about a virtual viewpoint image generation method that the information processing apparatus uses.

23. The information processing apparatus according to claim 19, wherein the information includes information about a virtual viewpoint image format that the information processing apparatus is able to display.

24. The information processing apparatus according to claim 19, wherein the one or more programs further include instructions to transmit the information to another apparatus from which the material data is to be output,
wherein the acquiring the material data selected based on the information output to the other apparatus.

25. An information processing method comprising:
acquiring a plurality of material data for use in generation of a virtual viewpoint image based on a plurality of images captured with a plurality of imaging apparatuses by imaging an object, the plurality of material data including first material data and second material data different from the first material data; and
outputting, to another apparatus serving as a material data output destination, material data that is selected based on information for identifying a format of material data from which the other apparatus is able to generate the virtual viewpoint image, from among the plurality of acquired material data.

26. An information processing method comprising:
acquiring material data that is selected based on information for identifying a format of material data from which a virtual viewpoint image is to be generated, from among a plurality of material data for use in generation of the virtual viewpoint image based on a plurality of images captured with a plurality of imaging apparatuses by imaging an object, the plurality of material data including first material data and second material data different from the first material data; and
generating the virtual viewpoint image, based on the acquired material data.

27. A non-transitory computer-readable storage medium storing a program that causes a computer to perform a process which comprising:
acquiring a plurality of material data for use in generation of a virtual viewpoint image based on a plurality of images captured with a plurality of imaging apparatuses by imaging an object, the plurality of material data including first material data and second material data different from the first material data; and
outputting, to another apparatus serving as a material data output destination, material data that is selected based on information for identifying a format of material data from which the other apparatus is able to generate the virtual viewpoint image, from among the plurality of acquired material data.

* * * * *